US012205225B2

(12) United States Patent
Ghosh et al.

(10) Patent No.: US 12,205,225 B2
(45) Date of Patent: Jan. 21, 2025

(54) APPEARANCE CAPTURE UNDER AMBIENT LIGHTING CONDITIONS USING A DEEP-LEARNING NEURAL NETWORK MODEL

(71) Applicant: Lumirithmic Limited, Winchester (GB)

(72) Inventors: Abhijeet Ghosh, Orpington (GB); Gaurav Chawla, Shenfield (GB); Yiming Lin, London (GB); Gilles Rainer, London (GB); Lewis Bridgeman, Guildford (GB); Tristan Wride, Marlow (GB); Arvin Lin, London (GB)

(73) Assignee: Lumirithmic Limited, Winchester (GB)

( * ) Notice: Subject to any disclaimer, the term of this patent is extended or adjusted under 35 U.S.C. 154(b) by 164 days.

(21) Appl. No.: 17/972,009

(22) Filed: Oct. 24, 2022

(65) Prior Publication Data

US 2024/0135645 A1 Apr. 25, 2024
US 2024/0233265 A9 Jul. 11, 2024

(51) Int. Cl.
*G06T 17/20* (2006.01)
*G06T 5/20* (2006.01)
(Continued)

(52) U.S. Cl.
CPC ............... *G06T 17/20* (2013.01); *G06T 5/20* (2013.01); *G06T 5/70* (2024.01); *G06T 15/506* (2013.01);
(Continued)

(58) Field of Classification Search
CPC ..................................................... G06T 17/20
See application file for complete search history.

(56) References Cited

U.S. PATENT DOCUMENTS

2023/0031750 A1\* 2/2023 Li ........................... G06T 17/20
2024/0127529 A1\* 4/2024 Fu ......................... G01B 11/245

OTHER PUBLICATIONS

Deng Qixin et al: "End-to-End 3D Face Reconstruction with Expressions and Specular Albedos from Single In-the-wild Images", Oct. 10, 2022 (Oct. 10, 2022), XP059131115.
(Continued)

*Primary Examiner* — Shivang I Patel
(74) *Attorney, Agent, or Firm* — Ryan Dean; Umberg Zipser LLP

(57) ABSTRACT

A method is described which includes receiving a number of object images of an object. Each object image corresponds to a different view direction. First and second object images correspond to first and second directions. A mesh is determined corresponding to the target region of the object surface based on a first subset of the number of object images. Diffuse and specular maps are determined corresponding to the target region of the object surface based on processing a second subset of the object images using a deep learning neural network model trained to estimate diffuse and specular albedo components based on an input image. A tangent normal map is determined corresponding to the target region of the object surface based on high-pass filtering each object image of the second subset. The method also includes storing and/or outputting the mesh, the diffuse map, the specular map and the tangent normal map.

18 Claims, 18 Drawing Sheets
(6 of 18 Drawing Sheet(s) Filed in Color)

(51) Int. Cl.
*G06T 5/70* (2024.01)
*G06T 15/50* (2011.01)
*H04N 13/239* (2018.01)

(52) U.S. Cl.
CPC .... *G06T 2207/20021* (2013.01); *G06T 2210/44* (2013.01); *H04N 13/239* (2018.05)

(56) References Cited

OTHER PUBLICATIONS

European Patent Office, International Search Report and Written Opinion, Apr. 11, 2024.
Song Guoxian et al: "Recovering facial reflectance and geometry from multi-view images", Feb. 27, 2020, XP086141792.
Yang Mingxin et al: "Self-supervised Re-renderable Facial AlbedoReconstruction from Single Image", Journal of Latex Class Files, vol. pp, No. 99, 2022, Jun. 6, 2022 (Jun. 6, 2022), XP093124852.
Zhang Longwen et al: "Video-Driven Neural Physically-Based Facial Asset for Production", ACM Transactions on Graphics, vol. 41, No. 6, Sep. 16, 2022 (Sep. 16, 2022), pp. 1-16, XP093124715, us ISSN: 0730-0301.

* cited by examiner

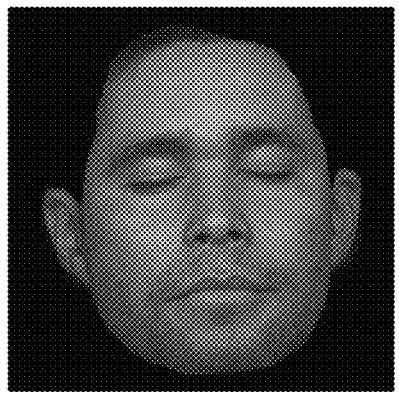 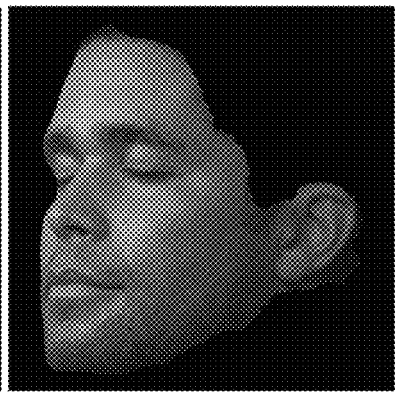 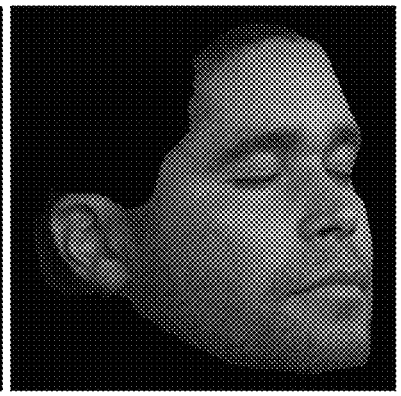
Fig. 16A            Fig. 16B            Fig. 16C
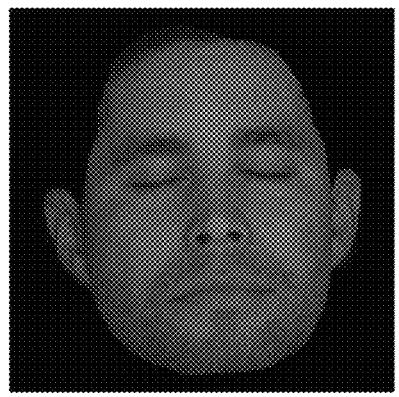 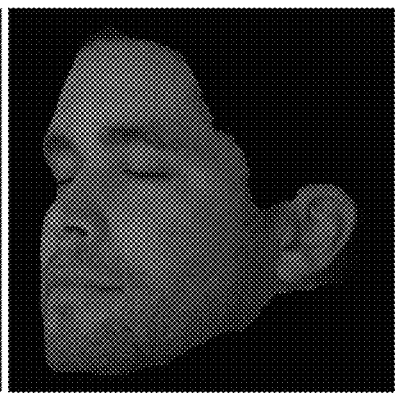 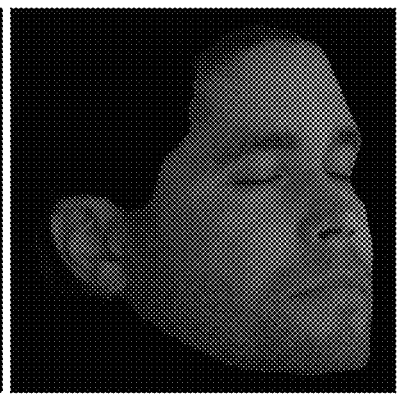
Fig. 17A            Fig. 17B            Fig. 17C
  
Fig. 18A            Fig. 18B            Fig. 18C

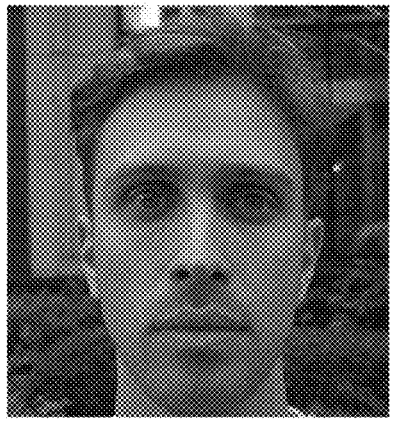
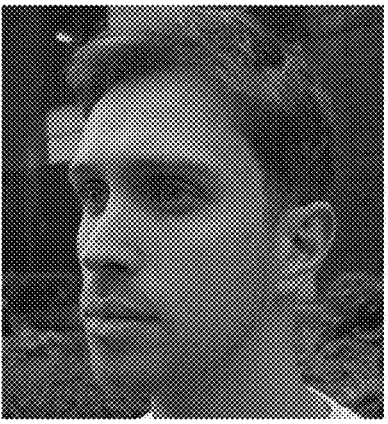
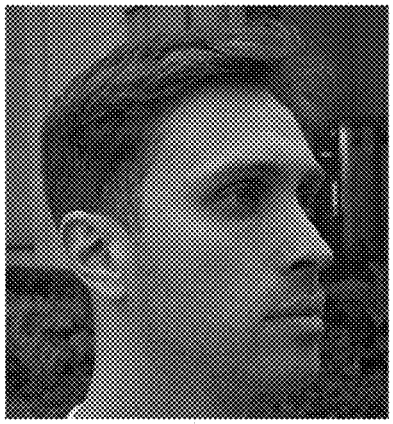
Fig. 19A              Fig. 19B              Fig. 19C
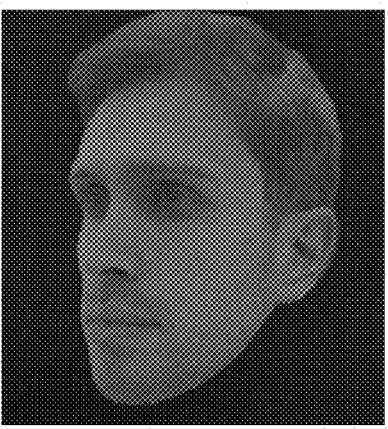
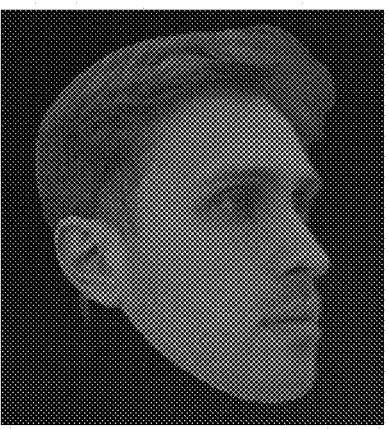
Fig. 20A              Fig. 20B              Fig. 20C

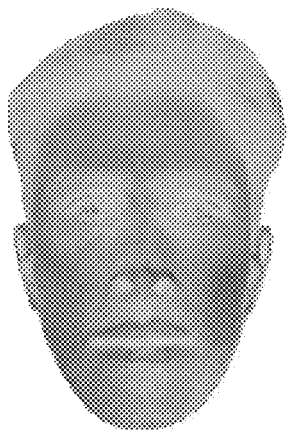
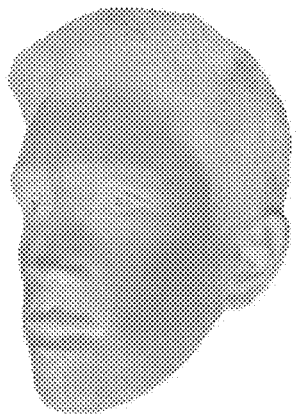
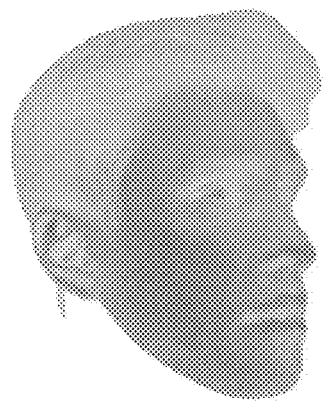
Fig. 21A  Fig. 21B  Fig. 21C
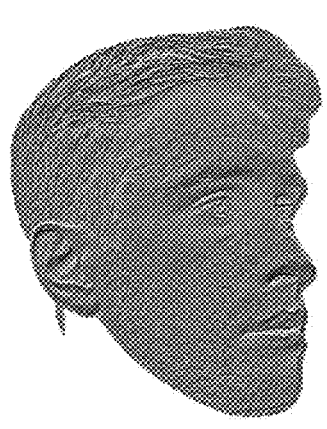
Fig. 22A  Fig. 22B  Fig. 22C

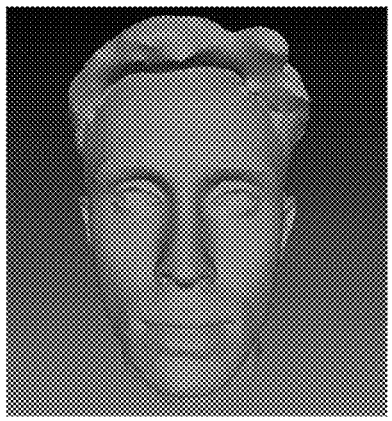 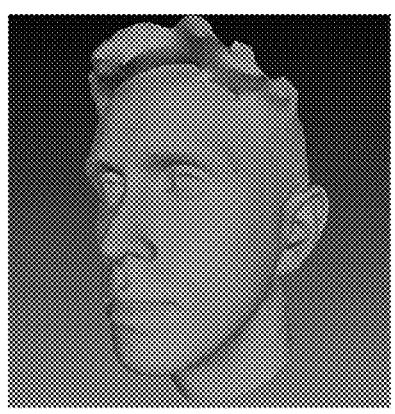 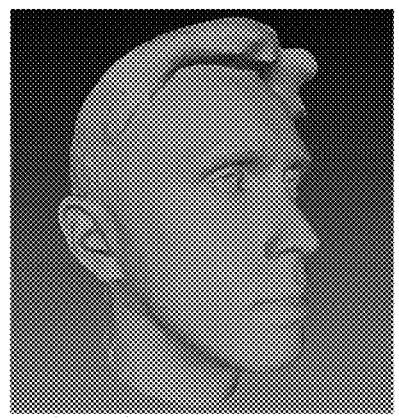
Fig. 23A  Fig. 23B  Fig. 23C
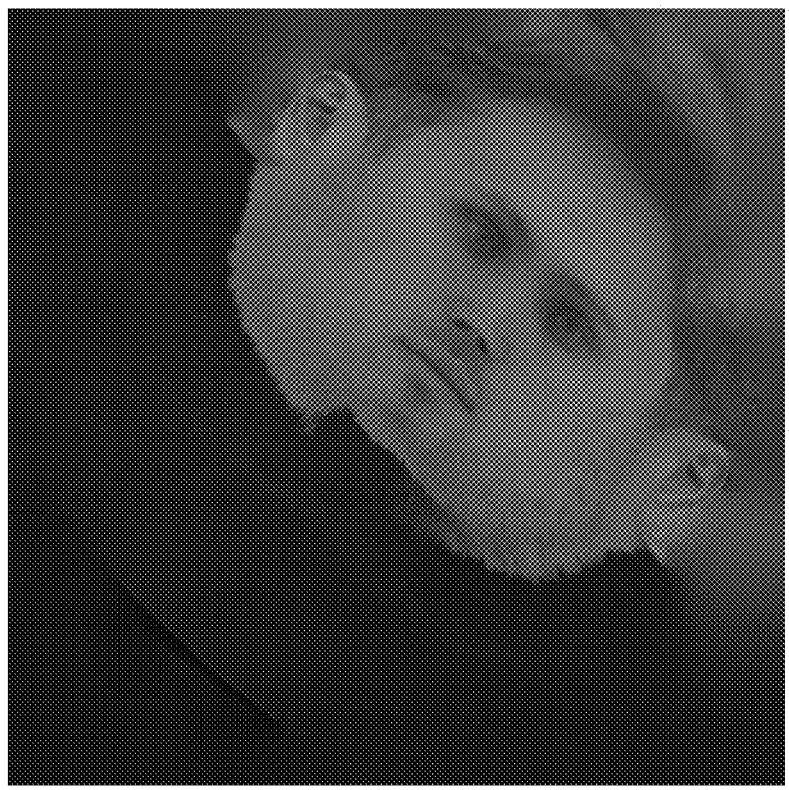
Fig. 24A

APPEARANCE CAPTURE UNDER AMBIENT LIGHTING CONDITIONS USING A DEEP-LEARNING NEURAL NETWORK MODEL

BACKGROUND

High quality 3D acquisition of a subject's face or an object/material including 3D shape and appearance has received a lot of attention in computer graphics for realistic rendering applications ranging from film visual effects and games, product design/visualization/advertising, and AV/VR applications.

Expensive, highly specialized lightstage setups for facial capture have been described, see for example "Acquiring the reflectance field of a human face", Paul Debevec, Tim Hawkins, Chris Tchou, Haarm-Pieter Duiker, Westley Sarokin, and Mark Sagar, Proceedings of the 27th annual conference on Computer graphics and interactive techniques (SIGGRAPH), 2000 (hereinafter "Debevec2000"). See also "Rapid acquisition of specular and diffuse normal maps from polarized spherical gradient illumination", Wan-Chun Ma, Tim Hawkins, Pieter Peers, Charles-Felix Chabert, Malte Weiss, Paul Debevec, EGSR'07: Proceedings of the 18th Eurographics conference on Rendering Techniques, Pages 183-194, June 2007 (hereinafter "Ma2007"). See also "Multiview face capture using polarized spherical gradient illumination", Abhijeet Ghosh, Graham Fyffe, Borom Tunwattanapong, Jay Busch, Xueming Yu, and Paul Debevec, ACM Transactions on Graphics (TOG) 30, 6, (2011) (hereinafter "Ghosh2011"). See also "Diffuse-specular separation using binary spherical gradient illumination", Christos Kampouris, Stefanos Zafeiriou, Abhijeet Ghosh, SR '18: Proceedings of the Eurographics Symposium on Rendering: Experimental Ideas & Implementations, July 2018 (hereinafter "Kampouris2018"). Such lightstage setups may achieve the highest quality and flexibility for rendering/relighting.

However, whilst such approaches may be used to capture high quality geometry and appearance data for high-end applications, there is also significant interest in more accessible image capture methods that may be performed using a single camera and under conditions of ambient lighting. For examples, see:

Cao et al, "Authentic Volumetric Avatars from a Phone Scan". ACM Trans. Graph. 41, 4, Article 1 (July 2022), https://doi.org/10.1145/3528223.3530143 (hereinafter "CAO2022").

Li et al, "Learning to reconstruct shape and spatially-varying reflectance from a single image", ACM Transactions on Graphics, Volume 37, Issue 6, December 2018, Article No.: 269, pp 1-11, https://doi.org/10.1145/3272127.3275055 (hereinafter "LI2018".

Bao et al, "High-Fidelity 3D Digital Human Head Creation from RGB-D Selfies", arXiv:2010.05562v2, https://doi.org/10.48550/arXiv.2010.05562 (hereinafter "BAO2020").

Lattas et al, "AvatarMe++: Facial Shape and BRDF Inference with Photorealistic Rendering-Aware GANs", arXiv:2112.05957v1, https://doi.org/10.48550/arXiv.2112.05957 (hereinafter "LATTAS2021").

Lattas et al, "AvatarMe: Realistically Renderable 3D Facial Reconstruction 'in-the-wild'", arXiv:2003.13845v1, https://doi.org/10.48550/arXiv.2003.13845 (hereinafter "LATTAS2020").

Yamaguchi et al, "High-Fidelity Facial Reflectance and Geometry Inference From an Unconstrained Image", ACM Trans. Graph. 37, 4, Article 162 (July 2018), 14 pages, https://doi.org/10.1145/3130800.3130817 (hereinafter "YAMAGUCHI2018").

Boss et al, "Two-Shot Spatially-Varying BRDF and Shape Estimation", June 2020, Conference: 2020 IEEE/CVF Conference on Computer Vision and Pattern Recognition (CVPR), DOI:10.1109/CVPR42600.2020.00404 (hereinafter "BOSS2020").

SUMMARY

According to a first aspect of the invention, there is provided a method including receiving a number of object images of an object. Each object image corresponds to a different view direction. The object images include first and second object images corresponding to first and second directions. The method also includes determining a mesh corresponding to the target region of the object surface based on a first subset of the plurality of object images which includes two or more object images of the number of object images. The method also includes determining diffuse and specular maps corresponding to the target region of the object surface based on processing a second subset of the object images using a deep learning neural network model trained to estimate diffuse and specular albedo components based on an input image. The second subset includes at least the first and second object images. The method also includes determining a tangent normal map corresponding to the target region of the object surface based on high-pass filtering each object image of the second subset. The method also includes storing and/or outputting the mesh, the diffuse map, the specular map and the tangent normal map.

Every part of a target region of the object surface may be imaged by at least one object image of the second subset. Every part of a target region of the object surface may be imaged by at least one of the first and second object images. The second subset of object images may include a third object image corresponding to a third direction. The diffuse and specular maps corresponding to the target region of the object surface may be determined based on processing a second subset including the first, second and third object images using the deep learning neural network model. The diffuse and specular maps corresponding to the target region of the object surface may be determined based on processing a second subset including the first, second and third object images, and one or more further object images, using the deep learning neural network model. The tangent normal map corresponding to the target region of the object surface may be determined based on high-pass filtering a second subset including each of the first, second and third object images. The tangent normal map corresponding to the target region of the object surface may be determined based on high-pass filtering each of a second subset including the first, second and third object images, and high-pass filtering each of one or more further object images.

In this way, the method is based on a minimum of two object images. However, three, four, or more object images may be used for each of determining the mesh and/or determining diffuse and specular maps. The number of object images used for meshing (the first subset) may be independent of the number of object images used for diffuse-specular estimation (the second subset). The second subset of object images used for determining diffuse and specular maps is always the same as the second subset of object images used for determining the tangent normal map.

Storing and/or outputting the mesh, the diffuse map, the specular map and the tangent normal map may include storing and/or outputting a rendering generated based on the diffuse map, the specular map and the tangent normal map.

Each of the first, second and (if used) third directions may be separated from each other of the first, second and (if used) third directions by 30 degrees or more. The first direction may make an angle of at least 30 degrees to the second direction, and if used, the first direction may make an angle of at least 30 degrees to the third direction. The second direction may make an angle of at least 30 degrees to the first direction, and if used, the second direction may make an angle of at least 30 degrees to the third direction. When used, the third direction may make an angle of at least 30 degrees to the first direction and the third direction may make an angle of at least 30 degrees to the second direction.

The first, second and (if used) third directions may be substantially co-planar. Substantially co-planar may refer to the possibility of defining a common plane making an angle of no more than 10 degrees to each of the first, second and third directions.

The first subset of object images upon which determination of the mesh is based may include, or take the form of, the first, second and (if used) third object images. The first subset of object images upon which determination of the mesh is based may exclude the first, second and (if used) third object images. In other words, the first and second subsets may intersect, or the first and second subsets may be mutually exclusive.

The target region may correspond to a fraction of the total surface of the objection. The target region may include, or take the form of, a face.

The first and second directions may be principal directions. When used, the third direction may also be a principal direction.

When the target region is a face, the first and second directions may be substantially co-planar and angled respectively at about ±45° to a front view (i.e. the first direction may be at −45° relative to the front view within the plane, whilst the second direction may be at +45°). About 45° may correspond to 45°±10°. The third direction, if used, may correspond to the front view. The front view may correspond to a frontal principal direction which is anti-parallel to a vector average of the face normals at each surface point of the face. The face normals may be determined based on the mesh.

The mesh is preferably determined based on a first subset including three or more object images of the plurality of object images. The mesh is preferably determined based on a first subset including ten or more object images of the plurality of object images.

The number of object images may include video data. The method may also include extracting the two or more object images forming the first subset upon which the mesh determination is based from the video data.

The first and second object images may be extracted from the video data. When used, the third object image may be extracted from the video data. The first, second and (if used) third object images may not be extracted from the video data.

The video data may correspond to moving the viewpoint through at least 45° of a first arc generally centred on the object (centred on the front view for face), and along at least 45° of a second arc generally centred on the object (centred on the front view for face) and intersecting the first arc at an angle between 30° and 90°. The video data corresponding to the first and second arcs may belong to a single, continuous video clip. The video data corresponding to the first and second arcs may belong to separate video clips.

Determining diffuse and specular maps corresponding to the target region of the object surface may include, for each of the second subset of the object images (which comprises at least the first and second object images), providing that object image as input to the deep learning neural network model and obtaining a corresponding camera-space diffuse map and a corresponding camera-space specular map as output. The method may also include generating a UV-space diffuse map based on projecting the camera-space diffuse maps corresponding to the second subset of the object images onto the mesh. The method may also include generating a UV-space specular map based on projecting the camera-space specular maps corresponding to the second subset of the object images onto the mesh.

The mesh may include a UV-coordinate for each vertex. Projecting a diffuse or specular map onto the mesh will associate each pixel with a UV-coordinate (which may be interpolated between vertices), resulting in generation of a UV map.

When the same UV-coordinate corresponds to pixels of two or more of the diffuse maps corresponding to the second subset, generating the UV-space diffuse map may include blending. When a UV-coordinate corresponds to two or more of the diffuse maps corresponding to the second subset, generating the UV-space specular map may include blending. Blending may include any techniques known in the art of multi-view texture capturing, such as, for example, averaging the low frequency response of two or more maps (or images), and embossing (superposing) high frequency responses (high pass filtered) from a single map (or image) corresponding to a view direction closest to the mesh normal at that UV coordinate. The low frequency response of a map (or image) may be obtained by blurring the map (or image), for example a Gaussian blurring. High frequency responses may be obtained by subtracting the low-frequency response of a map (or image) from that map (or image).

Determining diffuse and specular maps corresponding to the target region of the object surface may include generating a UV-space input texture based on projecting each of the second subset of the object images (which comprises at least the first and second object images) onto the mesh. The method may also include providing the UV-space input texture as input to the deep learning neural network model, and obtaining a corresponding UV-space diffuse map and a corresponding UV-space specular map as output. When a UV-coordinate corresponds to two or more of the object images of the second subset, generating the UV-space input texture may include blending.

In either case (camera-space or UV-space diffuse-specular estimation), the second subset may include one or more object images in addition to the first and second object images. For example, the third object image and/or one or more further object images.

Determining the mesh corresponding to the target region of the object surface may include applying a structure-from-motion technique to the first subset of the object images (including two or more object images of the plurality of object images).

The first subset of the object images used for the structure-from-motion technique may include the first and second images. The first subset of the object images used for the structure-from-motion technique may include, or take the form of, the first, second and third object images. Preferably, the structure-from-motion technique may be applied to a first subset including a number of between fifteen and thirty object images of the plurality of object images (inclusive of end-points).

The number of object images may include one or more depth maps of the target region and/or one or more structured light images of the target region. The first subset of object images upon which determination of the mesh is based may include the one or more depth maps and/or the one or more structured light images.

Determining a mesh corresponding to the target region of the object surface may include fitting a 3D morphable mesh model, 3DMM, to the first subset of object images of the plurality of object images.

Determining a mesh corresponding to the target region of the object surface may include a neural surface reconstruction technique.

The neural surface reconstruction technique may take the form of the NeuS method described by Wang et al in "NeuS: Learning Neural Implicit Surfaces by Volume Rendering for Multi-view Reconstruction", https://doi.org/10.48550/arXiv.2106.10689>

The deep learning neural network model for diffuse-specular estimation may include, or take the form of, a multi-layer perceptron.

The deep learning neural network model for diffuse-specular estimation may include, or take the form of, a convolutional neural network.

The deep learning neural network model may include, or take the form of, a generative adversarial network (GAN) model. The deep learning neural network model may include, or take the form of, a model as described by Wang et al, "High-Resolution Image Synthesis and Semantic Manipulation with Conditional GANs", in CVPR, 2018 (also called "Pix2PixHD").

The deep learning neural network model may include, or take the form of, a U-net model. An example of a suitable U-net model is described in Deschaintre et. al., "Deep polarization imaging for 3D shape and SVBRDF acquisition", Proceedings of the IEEE/CVF Conference on Computer Vision and Pattern, Recognition (CVPR), June 2021.

The deep learning neural network model may include, or take the form of, a diffusion model. The diffusion model may be tile based. The diffusion model may be patch based. An example of a suitable diffusion model is described in Özdenizci, O., & Legenstein, R. (2022) "Restoring Vision in Adverse Weather Conditions with Patch-Based Denoising Diffusion Models", arXiv, https://doi.org/10.48550/ARXIV.2207.14626

The method may also include receiving a number of environment images. Each environment image may correspond to a field of view oriented away from the object. The deep leaning neural network may be further configured to receive additional input based on the plurality of environment images.

Each environment image may correspond to an object image of the plurality of images, and the environment image and the corresponding object image may have fields of view oriented in opposite directions. For example, the object image of the plurality of object images may have been captured using a rear facing camera of a mobile phone (smartphone) or tablet computer, whilst the corresponding environment image may have been captured simultaneously using a front facing (or "selfie") camera of the mobile phone or tablet computer (or vice versa). Each object image of the second subset may corresponding to an environment image.

The number of environment images may include at least first and second environment images corresponding to the first and second object images respectively. When a third object image is include, a corresponding third environment image may be included. The first environment image may correspond to an opposite field of view to the first object image, from substantially the same location. The second environment image may correspond to an opposite field of view to the second object image, from substantially the same location. When used, the third environment image may correspond to an opposite field of view to the third object image, from substantially the same location.

In this way, by incorporating input based on the environment images, the deep learning neural network model may take account of environmental illumination conditions when estimating diffuse and specular components corresponding to the target region.

The deep leaning neural network may include a first encoder branch configured to convert an input object image to a first latent representation and a second encoder branch configured to convert an environment image corresponding to the input object image into a second latent representation. The first and second latent representations may be concatenated and then processed by a common decoder branch to generate the output diffuse map and specular map.

The method may also include mapping the plurality of environment images to an environment map, and providing the environment map as an input to the deep learning neural network model.

The environment map may correspond to a sphere, or a portion of a sphere, approximately centred on the object. Each pixel of each environment image may be mapped to a corresponding region of the sphere surface. Mapping the plurality of environment images to the environment map may also include infilling missing regions of the environment map. For example, the method may include infilling a region of the environment map corresponding to a convex hull of the environment images when projected onto the sphere surface. An image infilling deep learning model may be applied to generate infilled regions of the environment map. Alternatively, a separate infilling deep learning model need not be used, and a partial environment map may be directly encoded together with the camera pose and fed into the deep learning neural network In other examples, the environment map may correspond to a cylinder, or a portion of a cylinder.

The deep leaning neural network may include a first encoder branch configured to convert an input object image to a first latent representation and a second encoder branch configured to convert the environment map into a second latent representation. The first and second latent representations may be concatenated and then processed by a common decoder branch to generate the output diffuse map and specular map.

Determining the tangent normal map may include generating camera-space tangent normal maps based on high-pass filtering of the second subset of object images. Determining the tangent normal map may include generating a UV-space tangent normal map based on projecting the camera-space tangent normal maps corresponding to the second subset onto the mesh.

Determining the tangent normal map may also include generating a third camera-space tangent normal map based on high-pass filtering of the third object image, and generating the UV-space tangent normal map may be based on projecting the first, second and third camera-space tangent normal maps onto the mesh.

Determining the tangent normal map may include generating a UV-space input texture based on projecting the second subset of object images onto the mesh, and generating a UV-space tangent normal map based on high-pass filtering the UV-space input texture. When the third object image is used, generating the UV-space input texture may be based on projecting the first, second and third images onto the mesh.

When the diffuse and specular maps are estimated in UV space, the same UV-space input texture may be used as input to the deep learning neural network model and for calculation of the UV-space tangent normal map.

The method may also include determining a photometric normal map corresponding to the target region of the object surface based on the mesh and the tangent normal map. The photometric normal map may be determined based on embossing mesh normals with the tangent normal map.

The photometric normal map may be determined by determining high spatial-frequency components of surface normals as the output of providing the tangent normal map as input to a second deep learning neural network model trained to infer high spatial-frequency components of surface normal. Determining the photometric normal map may include combining the high spatial-frequency components of surface normals with mesh normals.

The method may also include generating a rendering of the object. The rendering may be based on the mesh, the diffuse map, the specular map and the tangent normal map. When calculated, the photometric normal may be used in addition, or as an alternative, to the tangent normal map.

The number of object images (including any video clips, depth maps and/or structure light images) may be received from a handheld device used to obtain the plurality of object images. When used, the plurality of environment images may also be obtained with, and received from, the same handheld device.

The method may also include using a handheld device comprising a camera to obtain the number of object images (including any video clips, depth maps and/or structure light images). When used, the method may also include using the handheld device to obtain the plurality of environment images.

The handheld device may include, or take the form of, a mobile phone or smartphone. The handheld device may include, or take the form of, a tablet computer. The handheld device may include, or take the form of, a digital camera. In other words, the handheld device may be a primarily intended for taking photographs, i.e. a dedicated use camera such as a digital single-lens reflex (DSLR) camera or similar.

The handheld device may be used only to obtain the plurality of object images and send them to a separate and/or remote (from the handheld device) location for processing. For example, the steps of the method other than obtaining the plurality of object images may be executed by a server or comparable data processing system communicatively coupled to the handheld device by one or more networks. The networks may be wired or wireless. The networks may include the internet.

The mesh, the diffuse map, the specular map and the tangent normal map may be output from a server executing the method to another server, and/or to the handheld device used to obtain the plurality of object images. The photometric normal map may be output from a server executing the method to another server, and/or to the handheld device used to obtain the plurality of object images. The rendering may be output from a server executing the method to another server, and/or to the handheld device used to obtain the plurality of object images.

Alternatively, the handheld device may be used to execute all of the steps of the method (i.e. local processing).

The method may also include processing one or more diffuse maps output by the deep learning neural network model and corresponding to an input image, including: generating a low-frequency image by blurring the input image; generating a high-pass filtered image by subtracting the low-frequency image from the input image; normalising the high-pass filtered image by pixelwise dividing by the input image; and generating a refined diffuse map based on pixelwise multiplying the diffuse map by a linear function of the normalised high-pass filtered image.

The linear function may take the form $f(\text{NORM}(i,j,k))=1+0.5 \cdot \text{NORM}(i,j,k)$, in which $\text{NORM}(i,j,k)$ is a pixel value of the normalised high-pass filtered image corresponding to the $i^{th}$ row, $j^{th}$ column and $k^{th}$ colour channel.

A refined diffuse map may be generated corresponding to each camera-space diffuse map, and the refined diffuse maps may be projected onto the mesh to generate the UV-space diffuse map Alternatively, the input image may be the UV-space input texture and the UV space diffuse map may be refined in the same way to generate a refined UV space diffuse map.

According to a second aspect of the invention, there is provided a non-transitory computer readable medium storing a computer program. The computer program, when executed by a digital electronic processor, causes the digital electronic processor to execute the method of the first aspect.

The computer program may include features corresponding to any features of the method. Definitions applicable to the method may be equally applicable to the computer program.

In relation to the feature of obtaining the plurality of object images and/or environment images using the handheld device, the computer program may include instructions to execute a graphical user interface configured to guide a user through the process of obtaining the plurality of object images and/or environment images using the handheld device.

According to a third aspect of the invention, there is provided a method of imaging an object including obtaining a number of object images of an object using a first camera of a handheld device. Each object image corresponds to a different view direction of the first camera. The method of imaging the object also includes obtaining a number of environment images using a second camera of the handheld device. The second camera is arranged with a field of view oriented substantially opposite to the first camera. Each environment image corresponds to an object image of the number of object images.

The number of object images may include first and second object images corresponding to first and second directions, such that every part of a target region of the object surface is imaged by at least one of the first and second object images.

The number of object images may also include a third object image corresponding to a third direction.

The method of imaging the object may include features corresponding to any features of the method of the first aspect. Definitions applicable to the method of the first aspect (and/or features thereof) may be equally applicable to the method of imaging the object (and/or features thereof).

The object images and environment images obtained using the method of imaging an object may be processed using the method of the first aspect.

According to a fourth aspect of the invention there is provided apparatus configured to receive a number of object images of an object. Each object image corresponds to a different view direction. The number of object images includes first and second object images corresponding to first and second directions. The apparatus is also configured to determine a mesh corresponding to the target region of the object surface based on a first subset of the number of object images which include two or more object images of the plurality of object images. The apparatus is also configured to determine diffuse and specular maps corresponding to the target region of the object surface based on processing a second subset of the object images using a deep learning neural network model trained to estimate diffuse and specular albedo components based on an input image. The second subset includes at least the first and second object images. The apparatus is also configured to determine a tangent normal map corresponding to the target region of the object surface based on high-pass filtering each object image of the second subset. The apparatus is also configured to store and/or to output the mesh, the diffuse map, the specular map and the tangent normal map.

The apparatus may include features corresponding to any features of the method of the first aspect, the computer program of the second aspect and/or the method of imaging the object according to the third aspect. Definitions applicable to the method of the first aspect (and/or features thereof), the computer program of the second aspect (and/or features thereof) and/or the method of imaging the object of the third aspect (and/or features thereof) may be equally applicable to the apparatus.

The apparatus may include a digital electronic processor, memory and non-volatile storage storing a computer program which, when executed by the digital electronic processor, causes it to execute the functions which the apparatus is configured to perform.

A system may include the apparatus and a handheld device. The handheld device may be as defined in in relation to the method of the first aspect and/or the method of imaging the object according to the third aspect.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

Certain embodiments of the present invention will now be described, by way of example, with reference to the accompanying drawings, in which:

FIGS. 16A to 16C show renderings used for training a deep learning network model for use in the method shown in FIG. 1;

FIGS. 17A to 17C show ground truth diffuse maps used for training a deep learning network model for use in the method shown in FIG. 1;

FIGS. 18A to 18C show ground truth (inverted) specular maps used for training a deep learning network model for use in the method shown in FIG. 1;

FIGS. 19A to 19C show images input to a method as shown in FIG. 1;

FIGS. 20A to 20C show diffuse maps generated corresponding to FIGS. 19A to 19C;

FIGS. 21A to 21C show (inverted) specular maps generated corresponding to FIGS. 19A to 19C;

FIGS. 22A to 22C show tangent normal maps corresponding to FIGS. 19A to 19C;

FIGS. 23A to 23C show a mesh determined corresponding to the subject imaged in FIGS. 19A to 19C;

FIG. 24A shows a UV-space (texture-space) diffuse map obtained by mapping and blending the diffuse maps shown in FIGS. 20A to 20C onto the mesh shown in FIGS. 23A to 23C;

DETAILED DESCRIPTION

Figure 1:
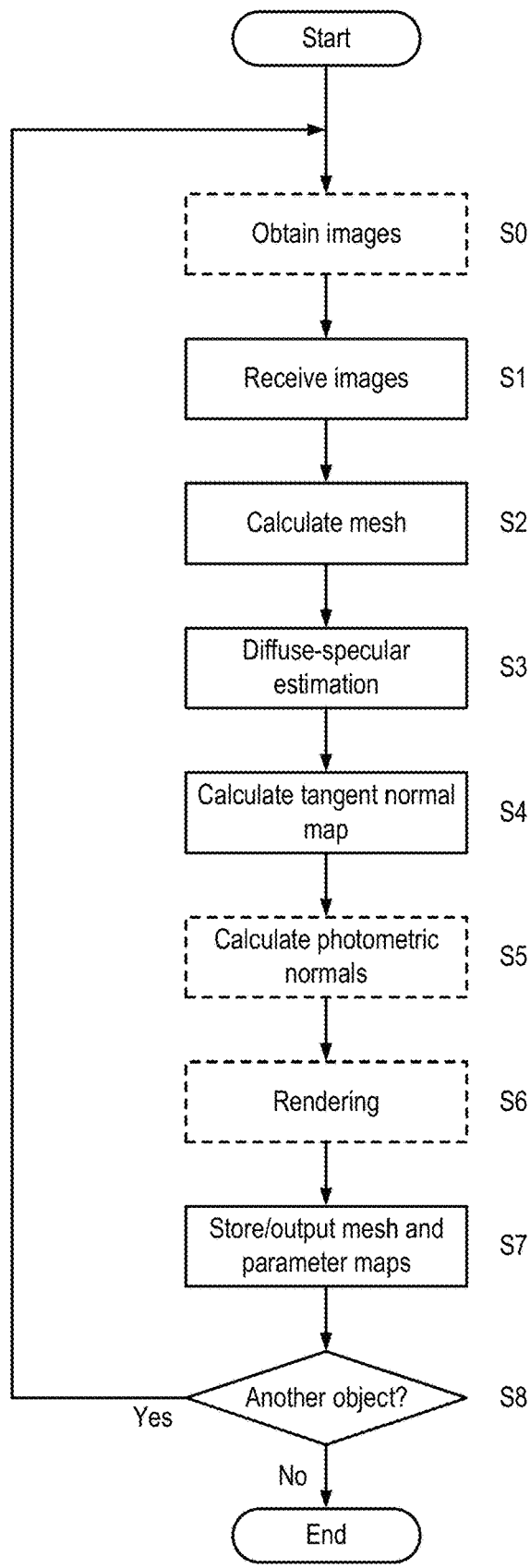
FIG. 1 is a process flow diagram of a method for processing images to acquire geometric and reflectance properties of an imaged object.

In the following, like parts are denoted by like reference numerals.

Herein, a method is described for obtaining 3D geometries and optical characteristic maps of an object using multi-view captures compatible with acquisition using a single handheld device which includes a camera. The optical characteristic maps include at least diffuse and specular reflectance maps and a tangent normal map, but may also (optionally) include further characteristics. The 3D geometries and optical characteristic maps obtainable using methods described herein may be used to generate accurate, photorealistic renderings of the imaged object, including human faces.

Referring to FIG. 1, a process-flow diagram of the general method is shown.

Figure 2:
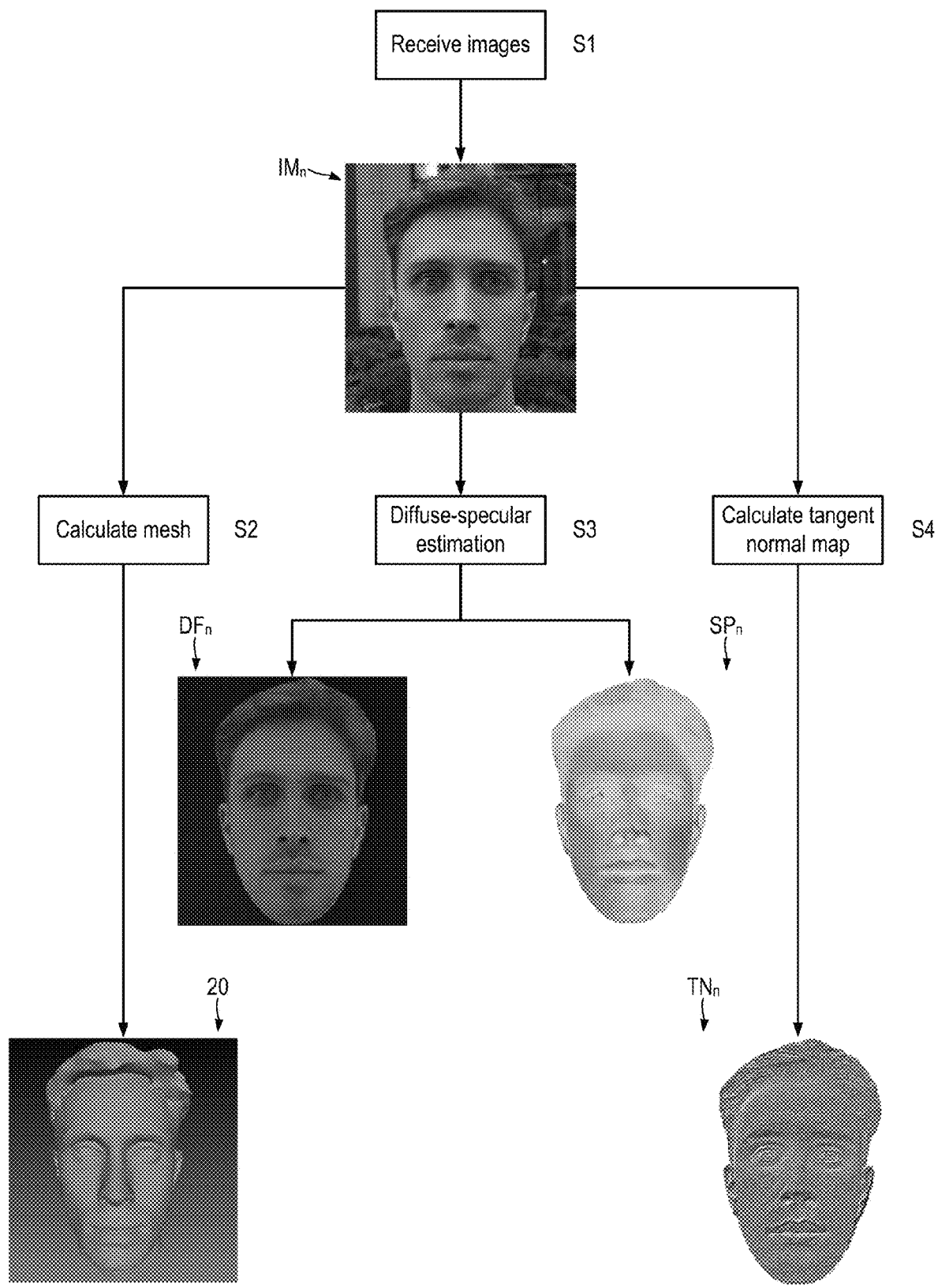
FIG. 2 presents examples of the inputs and outputs of the method shown in FIG. 1.

Referring also to FIG. 2, examples of input and output images during the method are shown. In FIG. 2, the specular image $SP_n$ shown has been inverted for visualisation and reproducibility. Similarly, a tangent normal map $TN_n$ shown in FIG. 2 has been inverted and the contrast re-balanced for the purposes of visualisation.

Figure 3:
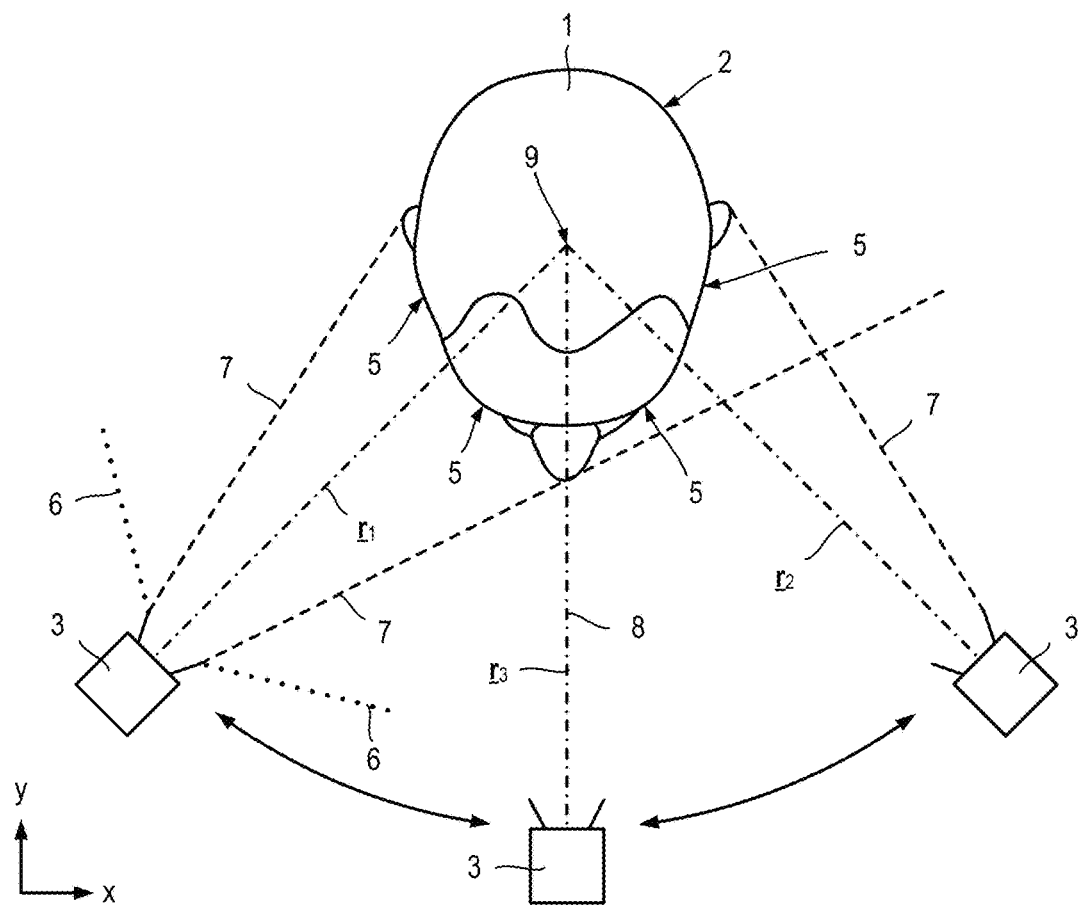
FIG. 3 schematically illustrates an exemplary geometry for obtaining images for processing with the method shown in FIG. 1.

Referring also to FIG. 3, an exemplary geometry of obtaining object images is schematically illustrated for an object 1 in the form of a human head.

An overview of the method shall be presented, followed by further details of each step.

Figure 26:
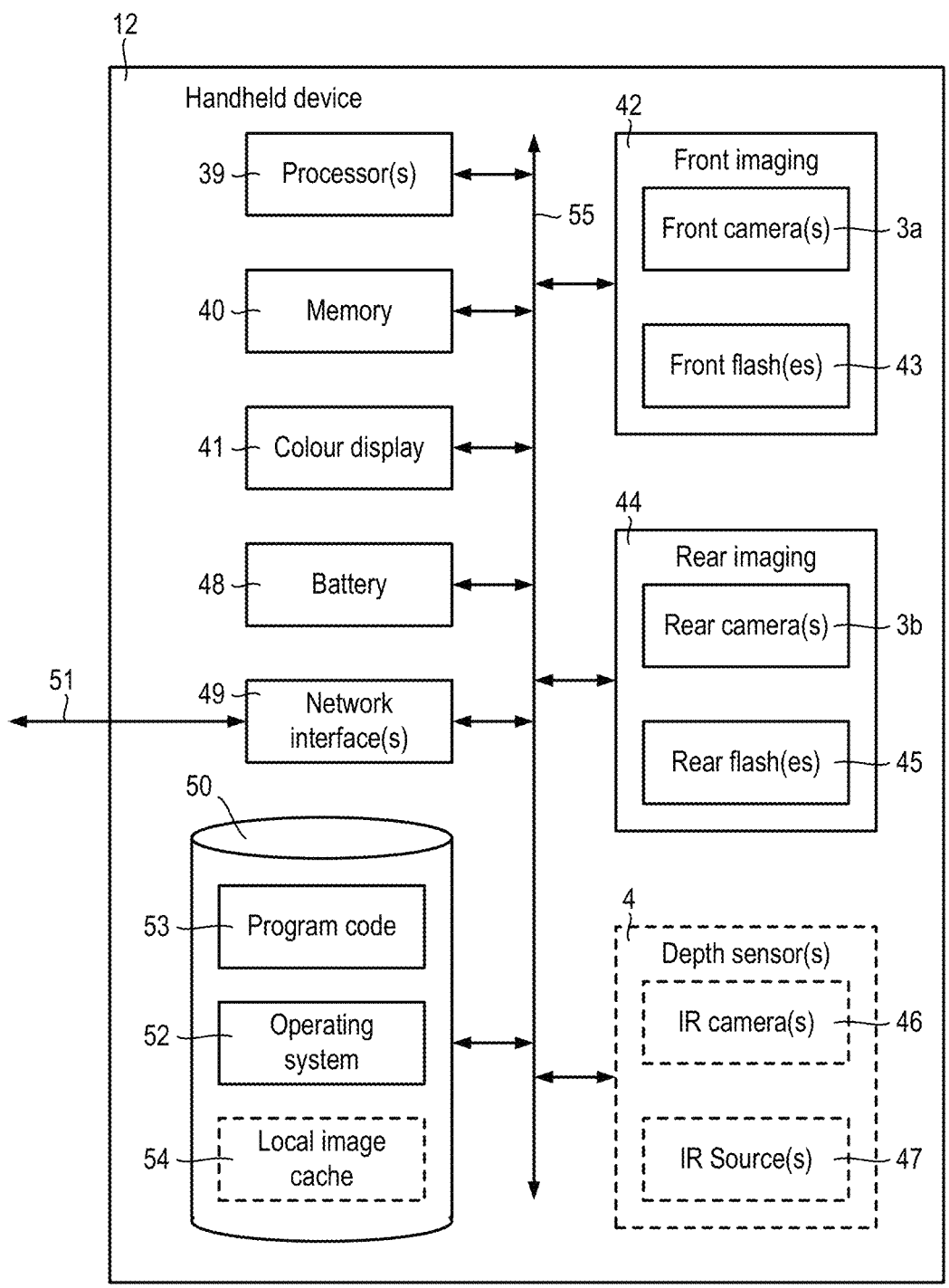
FIG. 26 is a schematic block diagram of an exemplary handheld device for use in obtaining images for input to the method shown in FIG. 1.

A number of images of an object 1 are received, hereinafter referred to as "object images" (step S1). For the purposes of the following descriptions, denote the $n^{th}$ of a total number N of object images as $IM_n$. Each object image $IM_n$ is made up of pixel values $IM_n(i,j,k)$ in which $1 \leq i \leq I$ and $1 \leq j \leq J$ denote pixel coordinates in the plane of the image (also referred to as the "camera plane") having resolution I by J, and $1 \leq k \leq K$ denotes the colour channel. For example, an RGB image $IM_n$ may have k=1 denoting red, k=2 denoting green and k=K=3 denoting blue. Some cameras 3 may obtain images $IM_m$ having more than three colour channels, for example infrared (IR), ultraviolet (UV), additional visible colours, or even depth when the camera 3 is aligned with (or adjacent to) a depth sensor 4 (FIG. 26). The camera planes of each image $IM_n$ will be oriented differently (perpendicular to the respective view direction $r_n$).

Each object image $IM_n$ corresponds to a different view direction r and includes an image of a portion of the object 1 surface 2 visible from that view direction r. Optionally, the object images $IM_n$ may be obtained as a prior step of the method (step S0), but equally the object images $IM_n$ may be obtained in advance and retrieved from a storage device for processing, or transmitted from a remote location. The object images $IM_n$ received include at least first and second object images $IM_1$, $IM_2$ obtained relative to the object 1. The first and second object images $IM_1$, $IM_2$ may be arranged such that every part of a target region 5 of the object surface 2 is imaged by at least one of the first and second object images $IM_1$, $IM_2$ (in other example, further object images $IM_n$ may be used, and this condition may apply to a subset REFLECT of object images $IM_n$ used for estimating diffuse and speculat). A pair of object images $IM_1$, $IM_2$ is the minimum number considered necessary to obtain diffuse and specular maps $DF_n$, $SP_n$ described hereinafter for a target region 5 such as the face of a subject 1.

Preferably, to obtain the best output quality, the object images $IM_n$ received include at least first, second and third object images $IM_1$, $IM_2$, $IM_3$ obtained relative to the object 1 such that every part of a target region 5 of the object surface 2 is imaged by at least one of the first, second and third object images $IM_1$, $IM_2$, $IM_3$. Although the third object image $IM_3$ is not essential, the description hereinafter will presume that the third object image $IM_3$ is included. The modifications to a minimum set of the first and second object images $IM_1$, $IM_2$ shall be apparent.

The object images $IM_n$ may be obtained under ambient lighting conditions, indoor or outdoor. In other words, special control of lighting is not required. Whilst precise control over illumination is not necessary, lower levels of ambient illumination may be supplemented. For example, when a handheld device 12 (FIG. 6) such as a mobile phone or tablet is used to obtain the object images $IM_n$, then a flash light emitting diode (LED) and/or a display screen of the handheld device 12 may be used to illuminate the object 1 with additional light.

A mesh 20 (see FIG. 2) corresponding to a target region 5 of the object 1 surface 2 is determined based on a first subset MESH (further discussed hereinafter) including two or more of the object images $IM_n$ (step S2). Preferably a larger number of the object images $IM_n$ are included in the first subset MESH and used to determine the mesh 20.

Diffuse $DF_{UV}$ and specular $SP_{UV}$ albedo maps corresponding to the target region 5 of the object 1 surface 2 are determined based on processing a second subset REFLECT (further discussed hereinafter) of the object images $IM_n$ using a deep learning neural network model trained to estimate diffuse and specular components based on an input image (step S3). The second subset REFLECT includes at least the first and second object images $IM_1$, $IM_2$, and preferably also the third object image $IM_3$, The term "albedo" herein refers to the nature of the diffuse $DF_{UV}$ and specular $SP_{UV}$ maps as components of reflectance of the target region 5 of the object/subject 1 surface 2, and for brevity the term "albedo" is not used in connection with the diffuse $DF_{UV}$ and specular $SP_{UV}$ maps throughout the present specification. As explained hereinafter, diffuse and specular may be estimated for the camera-space object images $IM_n$ to generate camera space diffuse $DF_n$ and specular $SP_n$ maps which are then projected (and blended) onto the mesh 20 to obtain the diffuse $DF_{UV}$ and specular $SP_{UV}$ maps corresponding to the target region 5 in UV-space (texture-space). Alternatively, camera-space object images $IM_n$ may be projected (and blended) onto the mesh 20 to obtain a UV-texture $IM_{UV}$ which is processed by the deep learning neural network model to directly estimate the diffuse $DF_{UV}$ and specular $SP_{UV}$ maps corresponding to the target region 5.

A tangent normal map $TN_{UV}$ is determined corresponding to the target region 5 of the object 1 surface 2 based on high-pass filtering each of the first and second object images $IM_1$, $IM_2$, and preferably also the third object image $IM_3$ (step S4). As explained hereinafter, and similarly to diffuse and specular estimation, the tangent normal map $TN_{UV}$ may be calculated in camera-space, or directly in UV-space.

Optionally, photometric normals $PN_{UV}$ corresponding to the target region 5 may be calculated based on the mesh 20 geometry and the tangent normal map $TN_{UV}$ (step S5). Photometric normals $PN_{UV}$ are used in rendering, and whilst computation in advance is not essential, this may speed up subsequent rendering. Determination of the photometric normals $PN_{UV}$ is discussed in further detail hereinafter.

Optionally, one or more renderings of the target region 5 of the object 1 may be generated (step S6). For example, the target region 5 may be rendered from several viewpoints and/or under different lighting conditions. Rendering viewpoints and/or lighting conditions may be user configurable, for example using a graphical user interface (GUI). A rendering may be based on the mesh 20, the diffuse map $DF_{UV}$, the specular map $SP_{UV}$ and optionally a photometric normal map $PN_{UV}$ based on the tangent normal $TN_{UV}$ map (whether pre-calculated or calculated at run-time).

The mesh 20, the diffuse map $DF_{UV}$, the specular map $SP_{UV}$ and the tangent normal map $SP_{UV}$ are stored and/or output (step S7). The mesh 20, the diffuse map $DF_{UV}$, the specular map $SP_{UV}$ and the tangent normal map $TN_{UV}$ corresponding to the target region 5 of the object 1 can then be retrieved as needed when it is desired to render a representation of the target region 5 of the object 1. For example, the outputs may be stored locally on a computer/server 14 (FIG. 6) executing the method and/or transmitted back to a source such as a handheld device 12 (FIG. 6) which obtained and/or provided the object images $IM_n$ (step S1).

Storing and/or outputting the mesh 20, the diffuse map $DF_{UV}$, the specular map $SP_{UV}$ and the tangent normal map $TN_{UV}$ may optionally include storing and/or outputting a photometric normal map $PN_{UV}$ (if step S5 is used) and/or rendering(s) generated based on the mesh 20, the diffuse map $DF_{UV}$, the specular map $SP_{UV}$ and the tangent normal map $TN_{UV}$ (if step S6 is used).

If there are further objects/subjects 1 to measure (step S8|Yes), the method is repeated.

Object Images

Referring in particular to step S1, suitable configuration of object images for subsequent processing shall be described.

The N object images $IM_1, \ldots, IM_N$ should include at least first and second object images $IM_1$, $IM_2$ corresponding respectively to first and second directions $r_1$, $r_2$ which are distributed about the object 1 such that every part of a target region 5 of the object surface 2 is imaged by at least one of the first and second object images $IM_1$, $IM_2$. Preferably, to obtain better quality diffuse $DF_n$ and specular $SP_n$ maps, the N object images $IM_1, \ldots, IM_N$ may also include a third object image $IM_3$ corresponding to a third direction $r_3$. The example shown in FIG. 3 uses first, second and third object imaged $IM_1$, $IM_2$, $IM_3$, and shall be explained in relation to all three (though it should be remembered that the third object image $IM_3$ is not essential).

Referring in particular to FIG. 3, a camera 3 has a corresponding field of view 6 (dotted line in FIG. 3). However, when a first object image $IM_1$ is captured along a first view direction $r_1$, the entire surface 2 of the object 1 is generally not visible due to obscuration by other parts of the surface 2. A visible boundary 7 represents the projection of the visible portions of the surface 2 to the camera 3 at the first view direction $r_1$. In the illustration of FIG. 3, the visible boundary 7 is bounded at one side by an ear of the subject 1 (when the object 1 is a person, we shall also use the term "subject"), and on the other (at maximum angle) by the nose of the subject 1. The visible boundary 7 is not necessarily a single closed curve, and in some cases there may be several separate sections accounting for locally occluded portions of the surface 2.

Therefore, any single image $IM_1$ generally cannot capture enough information to determine optical characteristics of a target region 5 of an object 1 surface 2 due to occlusions. The is particularly true for complex surfaces, such as the situation illustrated in FIG. 3, where the target region 5 is the face and the object/subject a head. Although approaches such as image in-filling networks, assumed symmetries and so forth could be applied, in the methods of the present specification, occlusion is resolved using multi-view imaging. For example, after obtaining the first image $IM_1$ the camera 3 is moved to a second view direction $r_2$ to obtain a corresponding second image $IM_2$, and to a third view direction $r_3$ to obtain a corresponding third image $IM_3$. The target region 5 for the method is then that portion of the surface 2 for which every part has been imaged in at least one of the first, second and third object images $IM_1$, $IM_2$, $IM_3$.

The first, second and third object images $IM_1$, $IM_2$, $IM_3$ may be viewed as defining the target region 5. Alternatively, if the target region 5 is known in advance, for example a subjects 1 face, then the view directions $r_1$, $r_2$, $r_3$ for capturing the first, second and third object images $IM_1$, $IM_2$, $IM_3$ may be selected accordingly to satisfy this condition.

For visual clarity of FIG. 3, the visible boundaries 7 have not been included for each of the second and third camera 3 positions, only for the rightmost extent of the camera 3 position corresponding to the second direction $r_2$, to illustrate the overall target region 5.

FIG. 3 illustrates capturing first, second and third object images $IM_1$, $IM_2$, $IM_3$ from respective view directions $r_1$, $r_2$, $r_3$ arranged about the target region 5 (face) of the object/subject 1 (head) in a single horizontal plane. For faces, this has been found to be generally workable due to the degree of occlusion being more significant moving horizontally than vertically (hence the need to capture from more angles horizontally). However, the object images $IM_1, \ldots, IM_N$ may be captured from a wide range of angles, depending on the shape of the target region 5 and the fraction of the total surface 2 which the target region represents (which could be up to 100% in some cases).

Further object images $IM_{n>3}$ may be obtained, and the first, second and third object images $IM_1$, $IM_2$, $IM_3$ may be taken to be those object images having visible boundaries the union of which corresponds to the target region 5. In other words, the first, second and third object images $IM_1$, $IM_2$, $IM_3$ are not necessarily sequential, but rather are the object images $IM_n$ corresponding to the outer extent of the target region 5, with intermediate object images $IM_n$ being optionally included to provide improved accuracy and reliability (through repeated sampling).

Whilst the object images $IM_1, \ldots, IM_N$ may be obtained by displacing a single camera 3 between different viewpoints, there is no reason why the object images $IM_1, \ldots, IM_N$ could not be obtained using two or more (or even N) different cameras 3.

Equally, whilst moving the camera 3 has been described, object images $IM_n$ from different view directions $r_n$ may instead be obtained by rotating the object/subject 1 and/or by a combination of moving the camera 3 and object/subject 1 relative to one another.

Whilst the specific example shown in FIG. 3 illustrates obtaining first, second and third object images $IM_1$, $IM_2$, $IM_3$, only the first and second object images $IM_1$, $IM_2$ are essential in the general case.

Figure 4:
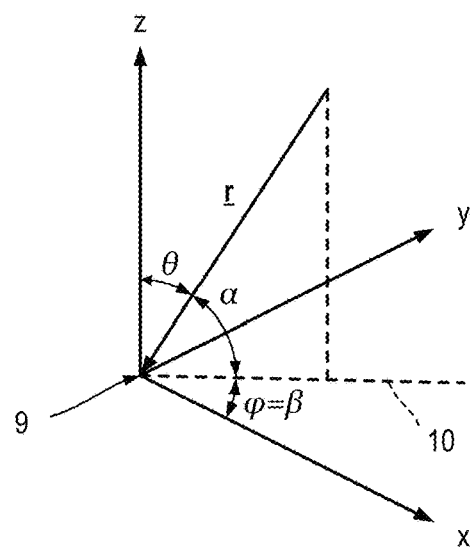
FIG. 4 illustrates coordinate systems referred to herein.

Referring also to FIG. 4, coordinate systems useful for defining view directions r are illustrated for reference.

A position vector r is illustrated against conventional right-handed Cartesian coordinates (x, y, z), the x-axis of which is taken to be aligned to a midline 8 of the target region 5, and the origin 9 of which located at the centroid of the object/subject 1. For example, in the illustration of FIG. 3, the midline 8 corresponds to the middle of the subjects 1 face, and the origin 9 is located at the middle of the subjects 1 head. The images $IM_n$ are obtained facing a direction corresponding to position vector r, which in these coordinates terminates at the origin 9.

It should be appreciated that the object images $IM_1, \ldots, IM_N$ will not in practice all be obtained such the view directions r converge at a single, point-like origin 9. The following discussions are intended as an approximate guide to the relative positioning of a camera 3 (or cameras 3) to obtain the object images $IM_1, \ldots, IM_N$. For a given set of object images $IM_1, \ldots, IM_N$, the method will include determining a global, objective coordinate space based on the multiple viewpoints, and mapping out the relative positions and viewpoints corresponding to each object image $IM_n$.

The projection of the position vector 1 onto the x-y (equatorial) plane is parallel to a line 10 within the x-y plane and making an angle $\beta=\varphi$ to the x-axis (and midline 9). In the illustration of FIG. 3, this line 10 is parallel to the plane of the figure and corresponds roughly to the horizontal. In the latitude-longitude spherical parameterisation, this is the longitude angle $\alpha$, and in spherical polar coordinates the azimuthal angle $\varphi$. The position vector r makes a latitude angle $\alpha$ to the x-y (equatorial) plane, and a polar angle $\theta$ to the z-axis. The position vector r is expressed in the latitude-longitude spherical parameterisation as (r, $\alpha$, $\beta$), with r being the length (magnitude) of position vector r extending back from the common origin 9. The position vector r is expressed in the latitude-longitude spherical parameterisation as (r, $\alpha$, $\beta$).

Figure 5:
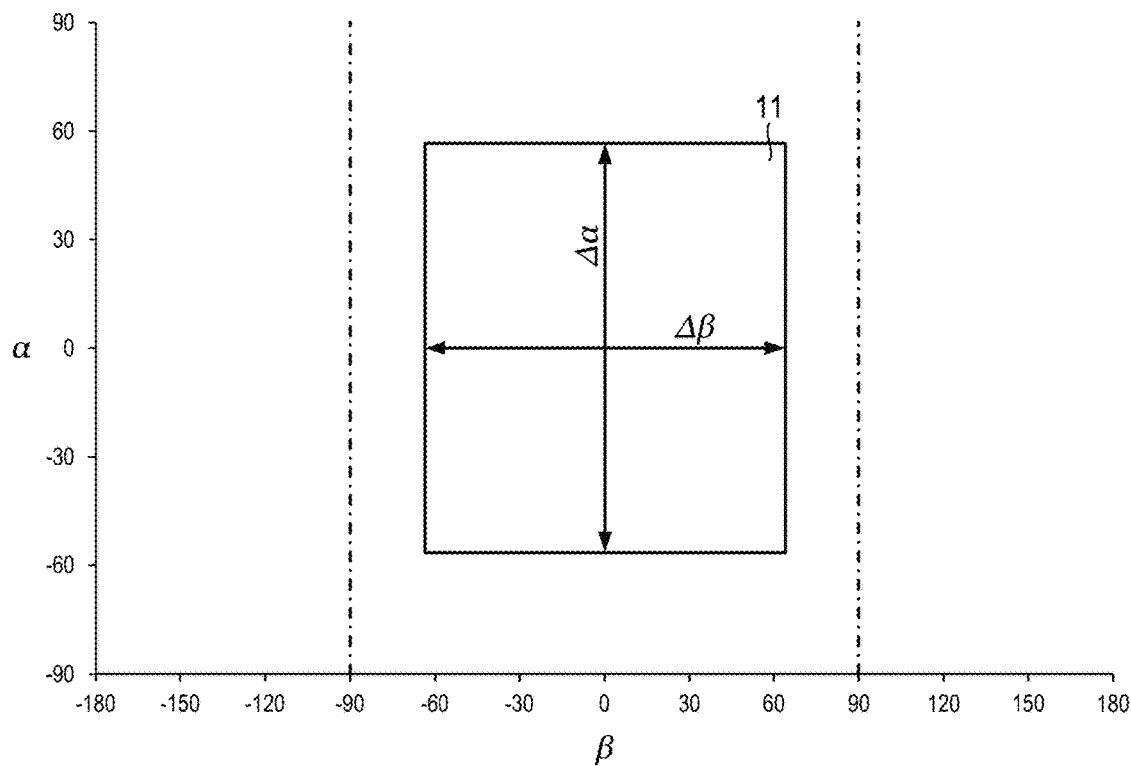
FIG. 5 illustrates ranges of angles from which an object is imaged for the method shown in FIG. 1.

Referring also to FIG. 5, ranges of angles relative to the object/subject 1 spanned by the object images $IM_n$ are shown and discussed.

For complete imaging of an object/subject 1 surface 2, the object images $IM_n$ would need to cover substantially all of the latitudinal $-90 \leq \alpha \leq 90$ and longitudinal $-180 < \beta \leq 180$ angles.

In practice, such extent is not usually required. In relation specifically to human faces, some guidelines may be provided.

Object images $IM_1, \ldots IM_N$ span a zone 11 of solid angle relative to the object/subject 1 spanning latitude $\Delta\alpha$ and longitude $\Delta\beta$, both centred at a midline 8 corresponding to the notional front of the subjects 1 face 5.

The object images $IM_1, \ldots, IM_N$ may be obtained at regular or irregular intervals along a first, horizontal arc at $\alpha=0$ and moving between $\beta=-\Delta\beta/2$ and $\beta=\Delta\beta/2$, and then at regular or irregular intervals along a second, vertical arc at $\beta=0$ and moving between $\alpha=-\Delta\alpha/2$ and $\alpha=\Delta\alpha/2$. For example, a first video clip may be obtained using the camera 3 moving around the first arc and a second video clip obtained moving around the second arc (in both cases, keeping the camera 3 pointed at the subject 1). The object images $IM_n$ may then be extracted as frames from the video clip data. In some examples, only a subset of object images $IM_n$ used for mesh generation (step S2) are extracted from video in this way, and higher resolution, still images $IM_n$ are obtained for input to the diffuse-specular estimation (step S3).

Alternatively, the object images $IM_1, \ldots IM_N$ may be obtained at regular or irregular intervals about the periphery of the zone 11, followed by obtaining one or more object images $IM_n$ within the zone 11.

Depending on the mesh generation method used (step S2), the total number N of object images $IM_n$ may be small, for example at minimum two (more preferably three). When relatively sparse object images $IM_n$ are used, the zone 11 simply corresponds to the bounding rectangle (in latitude-longitude) space) of the view directions $r_n$. When all the view directions $r_n$ are co-planar, the zone 11 may take the form of a line (for example when the minimum of first and second object images $IM_1$, $IM_2$ are used).

In should be noted that the first and second object images $IM_1$, $IM_2$, and any other images $IM_n$ (such as the third object image $IM_3$) used for diffuse-specular estimation (step S3) need not be located along the periphery of the zone 11, and often may not be, since the range of angles $\alpha, \beta$ needed for some meshing techniques (step S2) may require an angular range larger than is needed for diffuse-specular estimation of the target region 5. In other words, the first and second directions $r_1$, $r_2$, and preferably the third direction $r_3$, may define the zone 11 in some examples, but in other examples are simply contained within the zone 11.

In the general case, each of the first, second and (when used) third directions $r_1$, $r_2$, $r_3$ may be separated from each other of the first, second and (when used) third directions $r_1$, $r_2$, $r_3$ by 30 degrees or more. For faces, the inventors have found that the first, second and (when used) third directions $r_1$, $r_2$, $r_3$ may be substantially co-planar, with the first and second object images $IM_1$, $IM_2$ one spaced equally to either side of the front of the face $\alpha=\beta=0$ (or "front view") in the equatorial plane ($\alpha=0$). Empirically, the inventors have found that angles $\alpha=0$, $\beta=\pm45°$ work well for the first and second directions $r_1$, $r_2$. This arrangement generally corresponds to principal directions for a face. Preferably, a third object image $IM_3$ is also obtained, corresponding to the front view $\alpha=\beta=0$.

In some examples, the first, second and (when used) third object images $IM_1$, $IM_2$, $IM_3$ may be obtained after meshing (step S2). For example, enough object images $IM_n$ may be obtained (steps S0 and S1) to permit determining the mesh (step S3), before returning to obtain (steps S0 and S1) the first, second and (when used) third object images $IM_1$, $IM_2$, $IM_3$ from view directions $r_1$, $r_2$, $r_3$ determined based on the mesh. For example, The (third) front view direction $r_3$ may be set to correspond to a frontal principal direction which is anti-parallel to a vector average of the face normals at each surface point of the face, as determined based on the mesh, with the other pair of view directions $r_1$, $r_2$ then spaced to either side on the equatorial plane ($\alpha=0$). A user may be guided to locate the camera 3 correctly using audible and/or visual cues. For example, if the camera 3 is part of a handheld device 12 (FIG. 6) such as a mobile phone, a GUI may be used receiving input from a gyroscope/accelerometer (not shown) in the handheld device 12, so as to guide positioning.

Whilst the object images $IM_1, \ldots, IM_N$ may be received from any source, one particular application is to use a handheld device 12 to obtain the object images $IM_1, \ldots, IM_N$.

Figure 6:
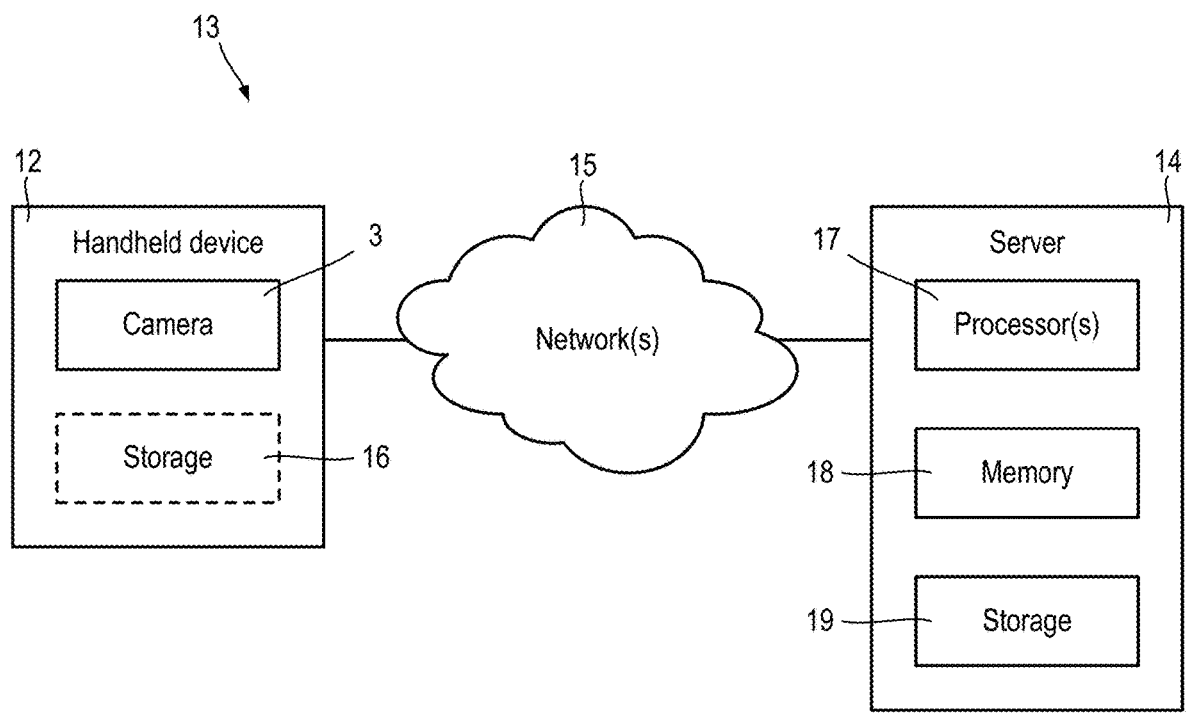
FIG. 6 schematically illustrates a system for carrying out the method shown in FIG. 1.

For example, referring also to FIG. 6, a system 13 is shown.

The system 13 includes a handheld device 12 in communication with a server 14 via one or more networks 15.

The handheld device 12 includes a camera 3, and is used to obtain (step S0) the object images $IM_1, \ldots, IM_N$. The object images $IM_1, \ldots, IM_N$ are then transmitted to the server 14 via the network(s) 15, and the server 14 carries out the more intensive processing steps (steps S1 through S5). Rendering (step S6) may be conducted on either or both of the handheld device 12 and the server 14. The storage (step S7) may be performed on either or both of the handheld device 12 (storage 16) and the server 14 (storage 19).

The handheld device 12 may include, or take the form of, a mobile phone or smartphone, a tablet computer, a digital camera and so forth. In some examples, the handheld device 12 may be primarily intended for taking photographs, i.e. a dedicated use camera 3 such as a digital single-lens reflex (DSLR) camera or similar. The handheld device 12 includes storage 16 which may optionally store local copies of the object images $IM_1, \ldots, IM_N$, and/or copies of the mesh and the diffuse, specular and tangent normal maps transmitted back from the server 14.

The server 14 may be any suitable data processing device and includes a digital electronic processor 17 and memory 18 enabling execution of computer program code for carrying out the method, for example stored in storage 19. Additional, common components of the server 14 are not shown for brevity.

In other examples, the server 14 need not be used, and instead the handheld device 12 may execute all of the steps of the method.

Mesh Generation

Referring again in particular to FIGS. 1 and 2, there are a number of options for the particular approach to determining the mesh (step S2).

The mesh corresponding to the target region 5 of the object 1 surface 2 is determined based on at least two of the object images $IM_n$, but depending on the particular method may include many more. Regardless of the number of object images $IM_n$ input, there is only a single mesh 20 generated. Each vertex of the mesh 20 has an associated coordinate, geometric normal, and list of other vertices to which it is connected.

The mesh generation (step S2) is based on a subset of the object images $IM_n$. Let ALL={$IM_1$, $IM_2$, ..., $IM_n$, ..., $IM_N$} be the set of all object images and MESH ⊂ ALL be the subset of object images $IM_n$ used as input for mesh generation (step S2). The subset MESH includes between 2 and N elements, and the precise minimum depends on the method used. Preferably, the subset MESH includes at least three, and preferably more, of the object images $IM_n$.

Depending on the mesh generation method used, the subset MESH may include one or both of the first and second object images $IM_1$, $IM_2$ (and/or the third object image $IM_3$ if used). Alternatively, for other methods the subset MESH may specifically exclude the first, second and (when used) third object images $IM_1$, $IM_2$, $IM_3$.

Structure-from-Motion:

The determination of the mesh 20 (step S2) may be carried out by applying a structure-from-motion (stereophotogrammetry) technique to a subset MESH including two or more of the object images $IM_n$. Preferably, when applying a structure-from-motion technique the subset MESH includes a number of between (including end-points) fifteen and thirty object images $IM_n$. Because the quality of structure—from motion techniques depends significantly on the number of input images, the approach described hereinbefore of obtaining video clips and then extracting object images $IM_n$ as frames of the video data may be particularly useful.

The choice of particular structure-from-motion method is not considered critical provided that it is capable of generating accurate 3D geometries based on a subset MESH of reasonable size (e.g. 15 to 30 object images).

Depth-Maps:

If the set ALL of object images $IM_n$ includes one or more depth maps of the target region 5, and/or one or more structured light images of the target region 5 from which a depth map may be calculated, then these may be used to generate the mesh 20.

For example, if a handheld device 12 includes a depth sensor 4 (FIG. 26), then the set ALL of received object images $IM_n$ may include the processed data in the form of a depth map, or the raw data in the form of a structured light IR image captured by the depth sensor 4 and from which a depth map be generated. In either case, a mesh 20 may be generated based on a single depth map, but better results may be obtained by merging depth maps from multiple viewpoints to generate the mesh 20.

In some examples, information from depth maps may be blended with information from structure-from-motion (stereophotogrammetry) to generate the mesh 20.

3D Morphable Mesh Model (3DMM):

3D morphable mesh models (3DMM) attempt to model an object as a linear combination of basis object geometries. For example, when the object 1 is a person and the target region 5 their face, the basis object geometries would be other faces.

3DMM fittings can be conducted based only a single image, however, for application of the present methods to faces, subset MESH should contain at least two object images $IM_n$ from different viewpoints, so as to more accurately capture the overall shape of a subjects 1 face 5.

The quality of 3DMM fittings tends to depend to a large extent on the quality and diversity of the available basis object geometries.

Neural Surface Reconstruction:

The determination of the mesh 20 (step S2) may be carried out by applying a neural surface reconstruction technique to the subset MESH of object images $IM_n$. For example, the NeuS method described by Wang et al in "NeuS: Learning Neural Implicit Surfaces by Volume Rendering for Multi-view Reconstruction", https://doi.org/10.48550/arXiv.2106.10689 (hereinafter "WANG2021").

Diffuse-Specular Estimation

Referring again in particular to FIGS. 1 and 2, there are a number of options for determining diffuse and specular maps corresponding to the target region using a deep learning neural network model (step S3).

Broadly, the approaches may be separated into:
Camera-space estimation followed by merging (see FIG. 11); or
Merging followed by UV (texture) space estimation (see FIG. 12).

Though requiring contextual training, the same types of deep learning neural network model may be used in either case. Camera-space estimation shall be discussed first.

The deep learning neural network model is an image-to-image translation network trained to receive an input image, for example an object image $IM_n$, and to generate a pair of output images, one corresponding to the diffuse component and a second corresponding to the specular component. Let $DF_n$ denote the diffuse component of an object image $IM_n$, and let $SP_n$ denote the specular component (see FIG. 2).

The deep learning neural network model is not restricted to a certain network architecture, and any image-to-image translation network could be used if trained appropriately. Ground truth data (meshes, diffuse and specular data) for training is preferably obtained using a light-stage or equivalent function capture arrangement. For example, the apparatuses and methods described in U.S. Ser. No. 17/504,070 and/or PCT/GB2022/051819, the contents of which are both hereby incorporated in their entirety by this reference. Alternatively, light-stage or equivalent function captured data may be used to generate photorealistic renderings which may be used for generating training data (see FIGS. 16A to 18C).

For example, the deep learning neural network model may take the form of a multi-layer perceptron, a convolutional neural network, a diffusion network, and so forth.

Figure 7:
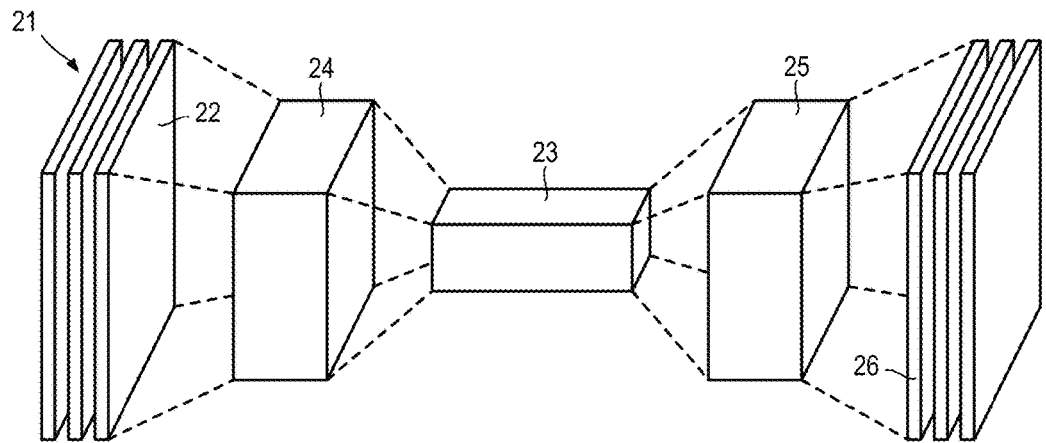
FIGS. 7 and 8 schematically illustrate the UNet architecture of a deep learning neural network model.

Referring also so FIG. 7, a high level schematic of a UNet model 21 is shown.

An input image 22 (for example including red, green and blue colour channels) is convolved to a latent vector representation 23 by an encoder 24. A decoder 25 then takes the latent vector representation 23 and devolves back to the original dimensions of the input image 22, thereby generating an output image 26. The output image 26 is shown as having the same colour channels as the input image 22, but may have more or fewer channels depending on the task the model 21 is trained for.

In the present context, a UNet model 21 used for diffuse-specular estimation may have a single encoder 24 and a branched structure with a pair of decoders 25, one for generating the diffuse map $DF_n$ and the other for the specular map $SP_n$ based on the same latent representation vector 23. Alternatively, a UNet model 21 could be trained for a single decoder 25 which devolves the latent representation vector 23 to an output image 26 having four colour channels, red diffuse, green diffuse, blue diffuse and specular.

Figure 8:
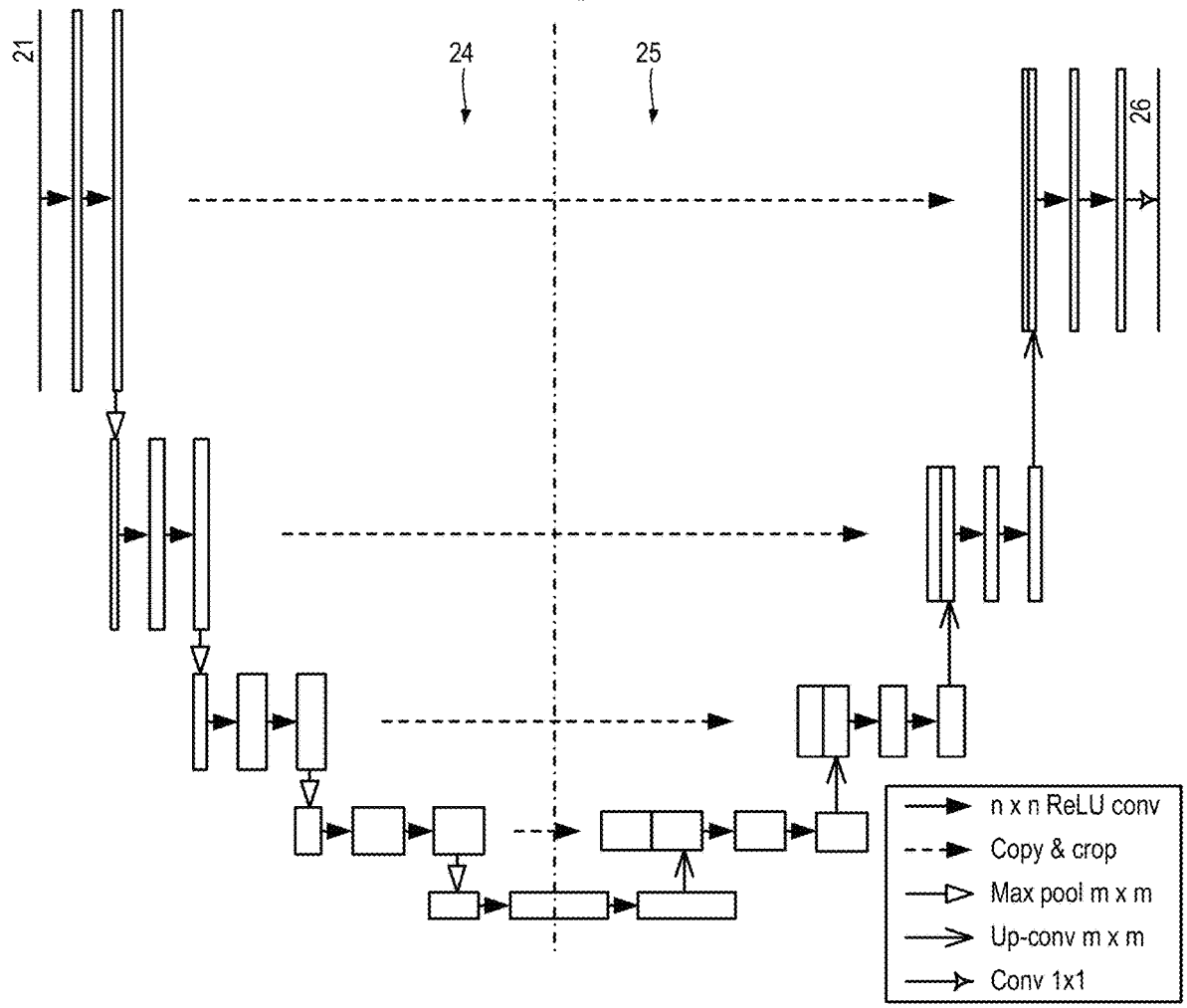

Referring also to FIG. 8, a more detailed schematic of a typical UNet model 21 is shown.

As the name suggests, the UNet model 21 has a symmetrical "U" shape. The encoder side 24 takes the form of a series of cascaded convolution networks, linked in series by max pool connections. An m by m max pool connection works by taking the maximum value of an m by m region. For example a 2 by 2 max pool would halve both dimensions of an image representation. On the decoder 25 side is similar to the encoder 24, except the convolution networks are cascaded in series with up-conversion (or up-sampling) connections which operate as the reverse of the encoder max pool connections.

More recent UNet architectures include copy and crop, or "skip", connections (illustrated with dashed line arrows in FIG. 8) which pass the high frequency information that got missed during the convolution from each encoder 24 layer to the corresponding decoder 25 layer.

As one example of a suitable UNet model 21, the inventors have confirmed that the methods of the present specification work using a U-net model are described in Deschaintre et. Al., "Deep polarization imaging for 3D shape and SVBRDF acquisition", Proceedings of the IEEE/CVF Conference on Computer Vision and Pattern, Recognition (CVPR), June 2021 (hereinafter "DESCHAINTRE2021").

Generative Adversarial Network Training

The generative adversarial network (GAN), is another deep learning network architecture that has been used for image-to-image translation.

Figure 9:
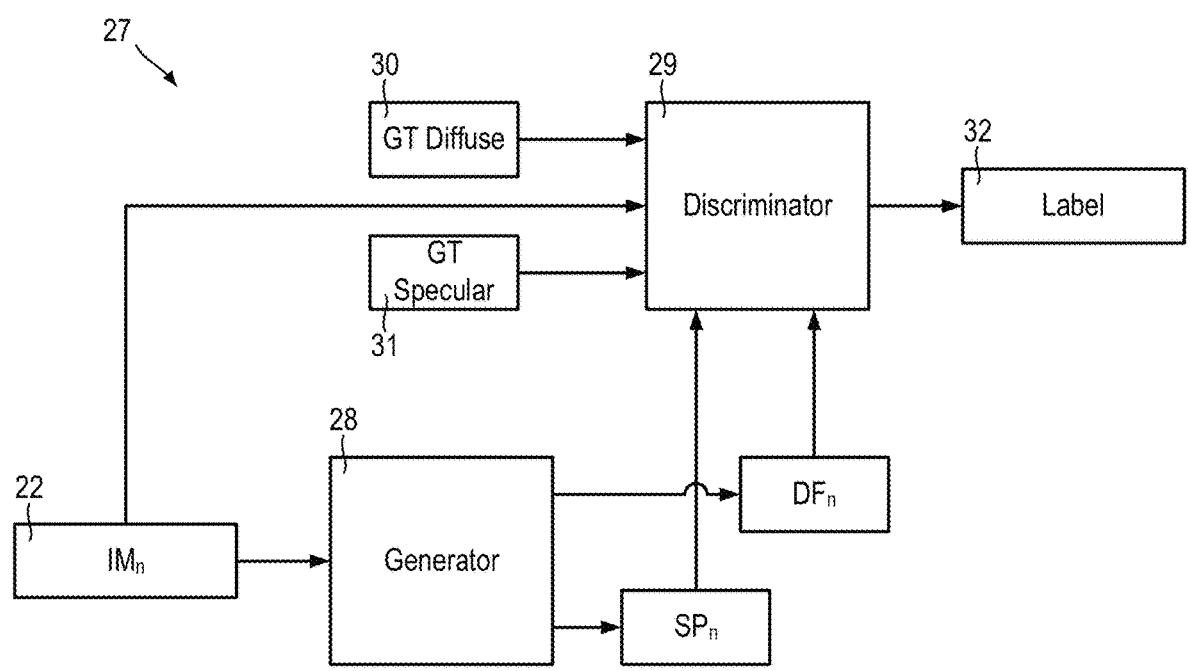
FIG. 9 schematically illustrates a generative adversarial network model.

Referring also to FIG. 9, a high-level schematic of a GAN model 27 is shown.

The GAN model 27 consists of two parts: a generator network 28 and a discriminator network 29. The generator network 28 takes an input image 22, for example an object image $IM_n$, and generates an output "fake image" or images. In the present context, the outputs would be the diffuse map $DF_n$ and specular map $SP_n$. The outputs are passed to the discriminator network, which outputs a label 32 indicating if an image is considered fake or real (by applying a label 31) using the ground truth data 30, 31 from the training set and corresponding to the input object image $IM_n$ (for example measured directly using active illumination techniques as mentioned hereinbefore). The discriminator 29 also receives the object image $IM_n$ as input. The generator 28 succeeds by generating outputs $DF_n$, $SP_n$ which the discriminator 29 is unable to distinguish as "fake". The original GAN models 27 used a noise vector as the input to the generator 28, but the illustrated architecture uses an image $IM_n$ as input, which is termed "conditional GAN", and the generator 28 is therefore an image-to-image translation network.

Any suitable image-to-image translation network may be used as generator 28, for example a multi-layer perceptron, of the UNet architecture described hereinbefore. Similarly, any suitable classifier may be used as the discriminator 29. Once the generator 28 has been trained using a suitable training set, the discriminator 29 may be discarded and the generator 28 applied to unknown images. In this way, GAN is essentially a particular approach to training the deep learning network model (generator) for the task of estimating diffuse $DF_n$ and specular $SP_n$ components based on the object images $IM_n$.

As one example of a suitable GAN model 27, the inventors have confirmed that the methods of the present specification work using a model as described by Wang et al, "High-Resolution Image Synthesis and Semantic Manipulation with Conditional GANs", in CVPR, 2018 (hereinafter "Pix2PixHD").

Diffusion Model

Figure 10:
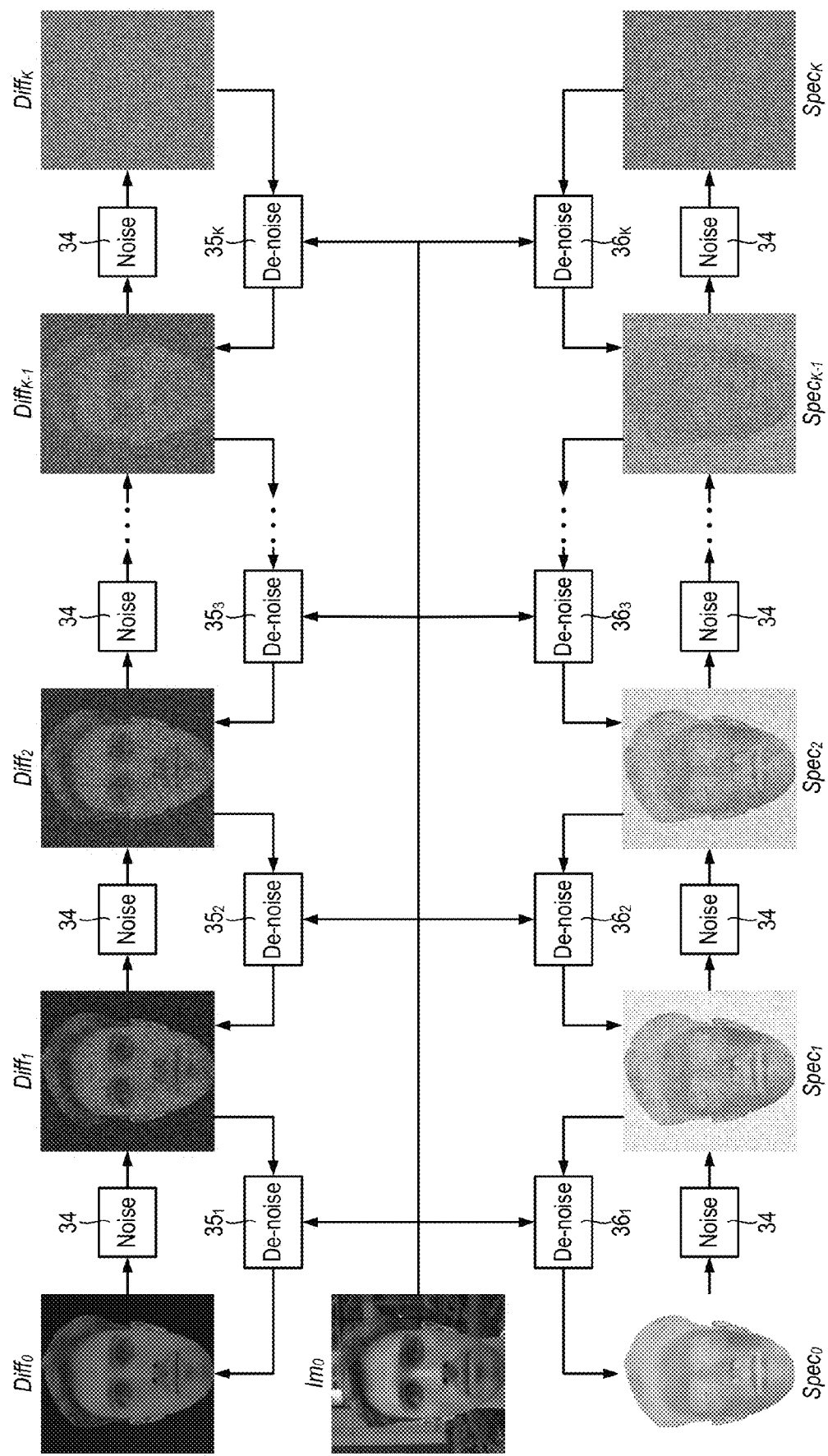
FIG. 10 schematically illustrates a diffusion model for diffuse-specular estimation of an input image.

Referring also to FIG. 10, a high level schematic of a diffusion model 33 is shown. The specular images $Spec_k$ shown in FIG. 10 have been inverted for visualisation.

At the left-hand side we have the ground truth images used for training, the input image $Im_0$, and the corresponding diffuse $Diff_0$ and specular $Spec_0$ components. As with all deep learning models discussed herein, the ground truth data used for training is obtained from light-stage or equivalent capture arrangements, or renderings generated using such data.

For each of the diffuse and specular maps, there is a noise adding branch and a de-noising branch. For example, the ground truth diffusion map $Diff_0$ has noise added by a noise generator 34 to generate a first generation noisy image $Diff_1$. The process is applied sequentially, until a $K^{th}$ noisy image $Diff_K$ is pure noise. The same processing is applied to generate noisy specular images $Spec_1, \ldots, Spec_K$. The noise generators 34 may be of any suitable type, for example Gaussian distributed. However, the statistical parameters of the noise generators 34 need not be identical for each step (though the actual noise is of course pseudo-random). For example, each noise generator 34 may add a different amount of noise to the other noise generators 34. In a preferred implementation, the amount of noise linearly increases with each generation of noisy image $Diff_k$, $Spec_k$.

The de-noising branch for diffuse maps is formed by sequential image-to-image de-noising networks 35 which are trained separately for each step. For example, the $K^{th}$ generation de-noising network $35_K$ is trained to recover the $K-1^{th}$ noisy diffuse image $Diff_{K-1}$ (acting as ground truth) based on inputs in the form of a noise image $Diff_K$ and the original image $Im_0$. Similarly along the de-noising branch, until the $1^{st}$ level de-noising network $35_1$ is trained to recover the ground truth image $Diff_0$ based on the first generation noisy diffuse image $Diff_1$ and the original image $Im_0$.

Once the de-noising networks $35_1, \ldots, 35_K$ have been trained, they may be applied to an image, for example object image $IM_n$, having unknown ground truth diffuse. For example, a pure noise image is generated and input to the $K^{th}$ generation de-noising network $35_K$ along with the object image $IM_n$, then propagated back to generate the estimate diffuse $DF_n$ (feeding in the object image $IM_n$ at each de-noising network $35_k$).

The de-noising branch for specular maps is similarly formed by sequential image-to-image de-noising networks 36 which are trained and used in the same way as the diffuse de-noising networks 35.

The noising networks 35, 36 may be any type of supervised learning image-to-image translation network, such as, for example a UNet model.

As one example of a suitable diffusion model 33, the inventors have confirmed that the methods of the present specification work using a model as described in Özdenizci, O., & Legenstein, R. "Restoring Vision in Adverse Weather Conditions with Patch-Based Denoising Diffusion Models", https://doi.org/10.48550/ARXIV.2207.14626 (hereinafter "OZDENIZCI2022").

Although diffusion networks 33 can require more effort to train and apply due to several generations of de-noising network 35, 36, the inventors have found that the results provide the highest quality of the deep learning neural network models tested so far (see for example FIGS. 19A to 21C obtained using a diffusion network 33 with K=25 generations. The diffusion network was as OZDEN-IZCI2022, modified for a four channel output instead of three channels. The outputs included three channels for diffuse albedo and one channel for specular).

Diffuse-Specular Estimation in Camera-Space:

As discussed hereinbefore, any of the described deep learning neural network models may be applied to diffuse-specular estimation in either camera-space or UV-space (texture-space) estimation.

Figure 11:
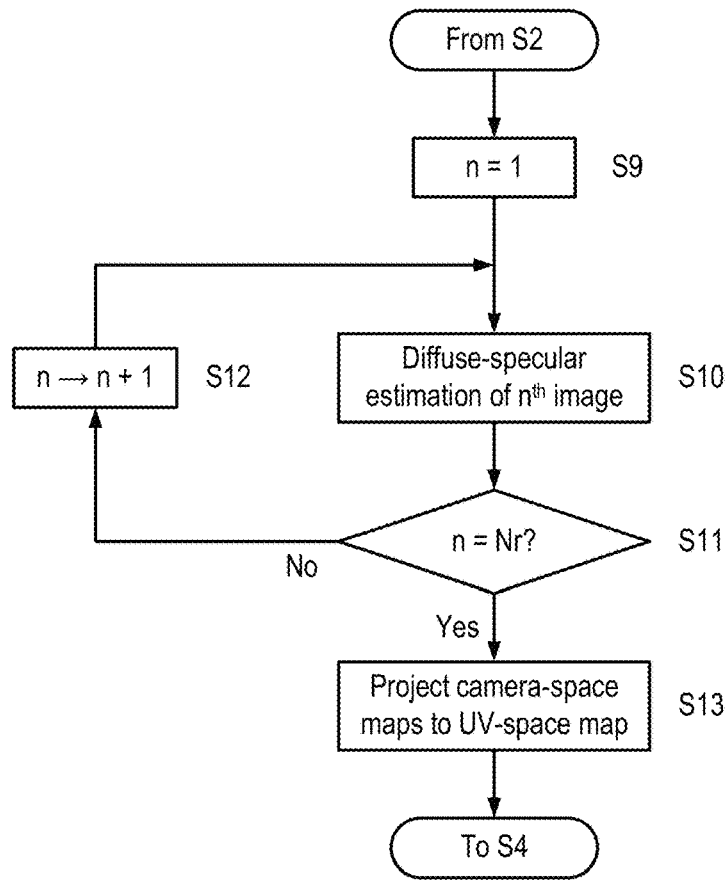
FIG. 11 is a process flow diagram illustrating a camera-space implementation of step S3 shown in FIG. 1.

Referring also to FIG. 11, further details of step S3 are shown for the case of camera-space diffuse-specular estimation.

The generation of diffuse-specular maps (step S3) is based on a subset of the object images $IM_n$. Reminding that ALL={$IM_1, IM_2, \ldots, IM_n, \ldots, IM_N$} denotes the set of all object images $IM_n$, then let REFLECT ⊂ ALL denote the subset of object images $IM_n$ used as input for generation of diffuse-specular maps (step S3). The subset REFLECT includes Nr elements, where Nr is between 2 and N. The subset REFLECT always includes the first and second object images $IM_1$, $IM_2$. The subset REFLECT may in general intersect the subset MESH. However, in some implementations the subsets REFLECT and MESH may be mutually exclusive.

For each of the Nr object images $IM_n$ belonging to the subset REFLECT, starting with the first n=1 (step S9), that object image $IM_n$ is provided as input to the deep learning neural network model, and outputs are obtained in the form of a corresponding camera-space diffuse map $DF_n$ and a corresponding camera-space specular map $SP_n$ (step S10).

If the index n is not yet equal to the subset REFLECT size Nr (step S11|No), then the next object image $IM_{n+1}$ is processed (steps S12 and S10).

Once all the object image $IM_n$ in the subset REFLECT have been processed (step S11|Yes), the camera space diffuse maps {$DF_1, \ldots, DF_{Nr}$} and the camera space specular maps {$SP_1, \ldots, SP_{Nr}$} are projected to texture space (step S13). A UV-space diffuse map $DF_{UV}$ is generated based on projecting the camera-space diffuse maps {$DF_1, \ldots, DF_{Nr}$} corresponding to the subset REFLECT onto the mesh 20. A UV-space specular map $SP_{UV}$ is generated based on projecting the camera-space specular maps {$SP_1, \ldots, SP_{Nr}$} corresponding to the subset REFLECT onto the mesh 20.

The mesh 20 includes a UV-coordinate (texture space coordinate) corresponding to each vertex. Projecting a diffuse map $DF_n$ or a specular map $SP_n$ onto the mesh 20 will associate each pixel in the camera space with a UV-coordinate (which may be interpolated for positions between vertices of the mesh 20), resulting in generation of the corresponding UV map $DF_{UV}$, $SP_{UV}$. When the same UV-coordinate corresponds to pixels of two or more of the subset REFLECT, generating the UV-space maps $DF_{UV}$, $SP_{UV}$ involves blending the corresponding pixels of the camera-space maps $DF_n$, $SP_n$.

Blending may be carried out using any techniques known in the art of multi-view texture capturing. For example, by averaging the low frequency response of two or more camera-space diffuse maps $DF_n$ and then embossing (superposing) high frequency responses (high pass filtered) from whichever one of the camera-space diffuse maps $DF_n$ corresponds to a view direction $r_n$ closest to the mesh 20 normal at the UV-coordinate. The same processing may be applied to specular maps $SP_n$. The low frequency response of a map $DF_n$, $SP_n$ may be obtained by blurring that map $DF_n$, $SP_n$, for example by Gaussian blurring. High frequency responses may be obtained by subtracting the low-frequency response of a map $DF_n$, $SP_n$ from that map $DF_n$, $SP_n$.

Figure 12:
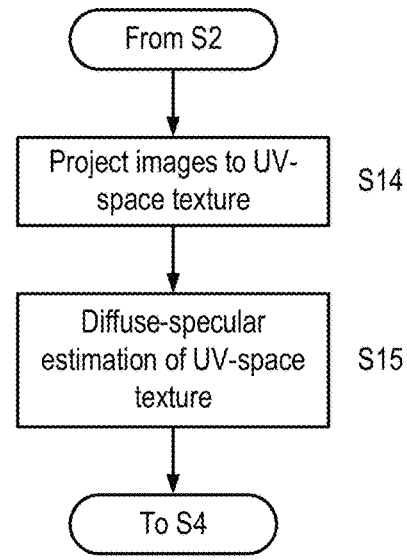
FIG. 12 is a process flow diagram illustrating a UV-space implementation of step S3 shown in FIG. 1.

Diffuse-Specular Estimation in UV-Space (Texture-Space):

Referring also to FIG. 12, further details of step S3 are shown for the case of UV-space (texture-space) estimation.

A UV-space input texture $IM_{UV}$ is generated based on projecting each object image $IM_n$ of the subset REFLECT onto the mesh 20 (step S14). The process may including blending pixels of the object images $IM_n$ corresponding to the same UV-coordinate, in the same way as for blending diffuse and specular maps $DF_n$, $SP_n$ in the camera-space approach.

The UV-space input texture $IM_{UV}$ is then input to the deep learning neural network model to directly obtain as output the corresponding UV-space diffuse map $DF_{UV}$ and UV-space specular map $SP_{UV}$ (step S15).

Compared to camera-space diffuse-specular estimation, performing the estimation in UV-space will occupy more memory than camera-space data unless broken up into smaller patches. Even then, if the UV-space data is broken up into portions, the partial UV-space maps would have to have a continuous parameterization as a fragmented one would not work for partitioning the UV-space data into patches. A continuous parameterization in practice may be difficult to obtain from a direct scan but is instead usually the result of a mesh template registration process. Consequently, the UV-space input texture $IM_{UV}$ would require this additional registration step or registration to a 3DMM for the appropriate continuous parameterization. Consequently, the camera-space diffuse-specular estimation approach may be preferable to reduce memory and/or computational requirements for performing the diffuse-specular estimate (step S3).

Tangent Normal Map Calculation

Referring again in particular to FIGS. 1 and 2, calculation of the tangent normal map (step S4) shall be explained in greater detail.

Tangent normal maps are generated based on high-pass filtering an input image, such as an object image $IM_n$.

Figure 14:
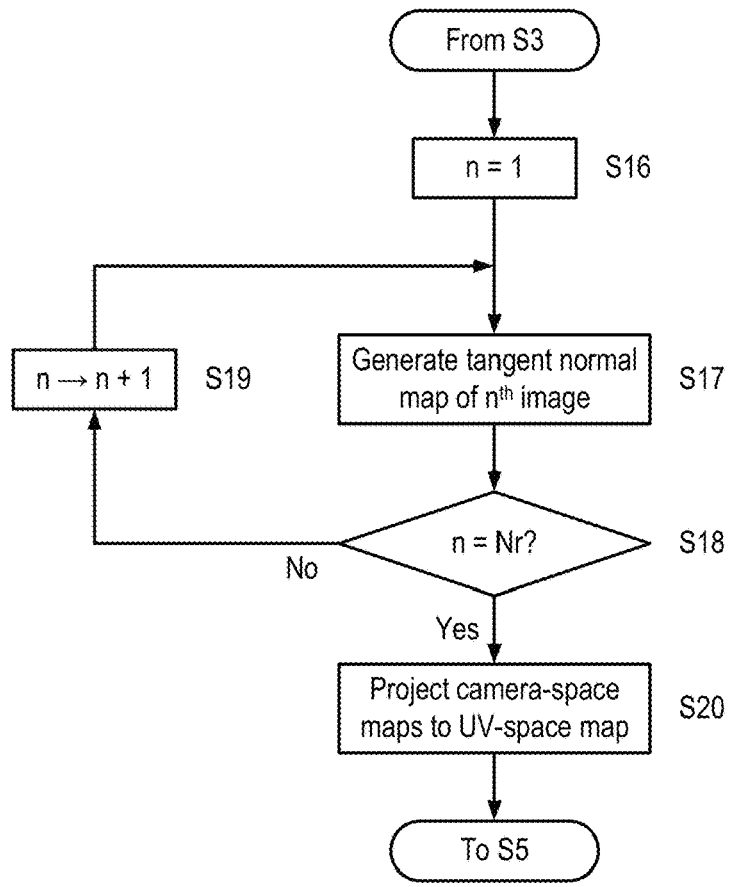
FIG. 14 is a process flow diagram illustrating a camera-space implementation of step S4 shown in FIG. 1.
Figure 15:
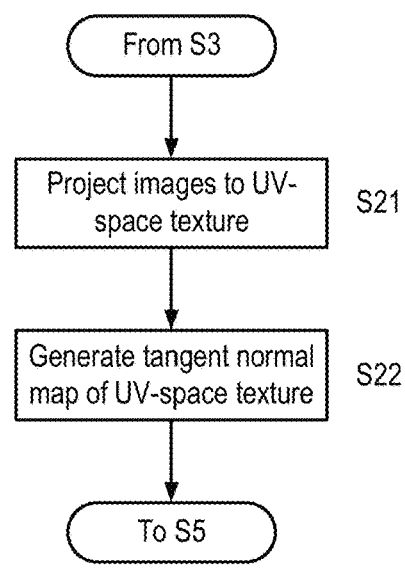
FIG. 15 is a process flow diagram illustrating a UV-space implementation of step S4 shown in FIG. 1.

Similarly to diffuse-specular estimation, the determination of a tangent normal map corresponding to the target region 5 of the object 1 surface 2 may be carried out in camera-space (FIG. 14) or in UV-space (FIG. 15).

Figure 13:
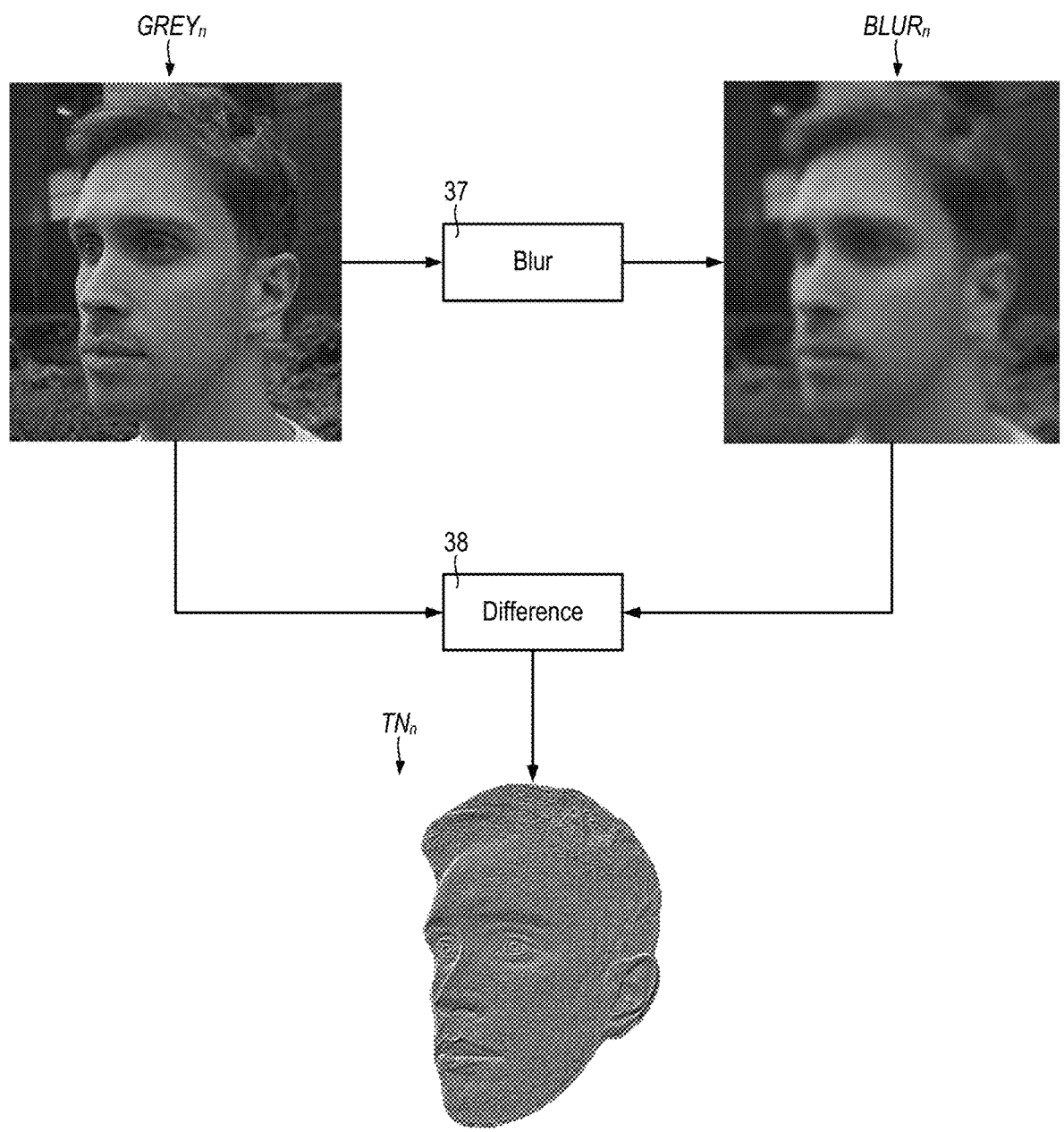
FIG. 13 schematically illustrates an exemplary method for calculating a tangent normal map of an input image.

Referring also to FIG. 13, an exemplary method of generating a tangent normal map (step S4) is illustrated. The tangent normal map $TN_n$ has been processed to maximise contrast for visualisation purposes.

For the purposes of explaining the exemplary method, an input image in the form of an object image $IM_n$ shall be assumed, though the method does not depend on the nature of the input image.

The input image $IM_n$ is converted to a greyscale image $GREY_n$. A blur filter 37 is applied to the greyscale image $GREY_n$ to generate a blurred image $BLUR_n$. For example a Gaussian blur filter may be applied (for images shown herein, a kernel size of five was used, corresponding to a radius of two). The blurred image $BLUR_n$ includes only low spatial frequencies due to the blurring. The greyscale image $GREY_n$ and the blurred image $BLUR_n$ are then input to a difference block 38 to subtract the blurred image $BLUR_n$ to generate a tangent normal map $TN_n$ which includes only the high spatial frequency content of the greyscale image $GREY_n$.

This is not the only way to generate high-pass filtered information, and as an alternative, the greyscale image $GREY_n$ may be subjected to a 2D Fourier transform, a high pass filter applied in frequency space, before inverse Fourier transformation to generate the tangent normal map $TN_n$.

Camera-Space Processing:

As discussed hereinbefore, tangent normal maps may be generated using input images in camera-space or UV-space (texture-space).

Referring also to FIG. 14, further details of step S4 are shown for the case of camera-space tangent normal calculations.

The generation of tangent normal maps (step S4) is based on a the same subset REFLECT of object images $IM_n$ as the diffuse-specular estimation.

For each of the Nr object images $IM_n$ belonging to the subset REFLECT, starting with the first n=1 (step S16), that object image $IM_n$ is used as input to calculate a corresponding camera-space tangent normal map $TN_n$ (step S17). The calculation may use the exemplary method explained in relation to FIG. 13, or any other suitable high-pass filtering method.

If the index n is not yet equal to the subset REFLECT size Nr (step S18|No), then the next object image $IM_{n+1}$ is processed (steps S19 and S17).

Once all the object image $IM_n$ in the subset REFLECT have been processed (step S11|Yes), the camera space tangent normal maps $\{TN_1, \ldots, TN_{Nr}\}$ are projected to texture space (step S20). A UV-space tangent normal map $TN_{UV}$ is generated based on projecting the camera-space tangent normal maps $\{TN_1, \ldots, TN_{Nr}\}$ corresponding to the subset REFLECT onto the mesh 20. If necessary, the projection process will include blending as described hereinbefore in relation to the camera-space diffuse-specular estimation method (FIG. 11).

UV-Space Processing:

Referring also to FIG. 15, further details of step S4 are shown for the case of UV-space (texture-space) calculations.

A UV-space input texture $IM_{UV}$ is generated based on projecting each object image $IM_n$ of the subset REFLECT onto the mesh 20 (step S21). The process may including blending pixels of the object images $IM_n$ corresponding to the same UV-coordinate, in the same way as for blending diffuse, specular or tangent normal maps $DF_n$, $SP_n$, $TN_n$ in the camera-space approaches.

The UV-space input texture $IM_{UV}$ is then processed to directly obtain as output the corresponding UV-space tangent normal map $TN_{UV}$ (step S22). The calculation may use the exemplary method explained in relation to FIG. 13, or any other suitable high-pass filtering method.

When the diffuse and specular maps $DF_{UV}$, $SP_{UV}$ are also estimated in UV space (FIG. 12), there is no need to repeat the projection (step S21 may be omitted) and the same UV-space input texture $IM_{UV}$ may be used as input to the deep learning neural network model (step S3) and for calculation of the UV-space tangent normal map (step S22).

Compared to camera-space tangent-normal calculations, performing the calculations in UV-space relies critically on the consistency of the UV-coordinates. With some approaches to generating the mesh and associate UV-coordinates, the resulting UV-maps can be very fragmented, in which case the high pass filter may cause mixing of non-local regions and degrade the quality of the tangent normal map $TN_{UV}$. This may require an additional registration step or registration to a 3DMM for the appropriate continuous parameterization (as discussed hereinbefore in relation to diffuse-specular estimation).

Photometric Normal Calculations

Referring again in particular to FIGS. 1 and 2, the calculation of photometric normals map (step S5) shall be explained in greater detail.

Photometric normal are needed for rendering, and hence calculation may be omitted unless/until it is needed to generate a rendering (step S6). However, it may be useful to pre-calculate photometric normal (step S5) and store/transmit these along with the mesh 20 and parameter maps $DF_{UV}$, $SP_{UV}$, $TN_{UV}$ to save computational cost in a subsequent rendering step (optionally the tangent normal map $TN_{UV}$ may be omitted in preference to the photometric normals).

Direct-Calculation:

The high-frequency image in the form of the tangent normal map $TN_{UV}$ can be treated as a height map, where dark is treated as "deep" and bright is treated as "high". The tangent normal map $TN_{UV}$ can be converted to a high-frequency normal map $HFN_{UV}$ by differentiation.

A photometric normal map $PN_{UV}$ is then generated by superposing the high-frequency normal map $HFN_{UV}$ with a geometric normal at each UV-coordinate. Geometric normal at a UV-coordinate are obtained by interpolation of the normal corresponding to the surrounding vertices. This process may sometimes be described as "embossing" the high frequency details of the tangent normal map $TN_{UV}$ onto the geometric normal from the mesh 20.

Machine-Learning Calculation:

Alternatively, instead of directly differentiating the tangent normal map $TN_{UV}$, the high-frequency normal map $HFN_{UV}$ may instead be determined by providing the tangent normal map $TN_{UV}$ as input to a second deep learning neural network model trained to infer high spatial-frequency components of surface normals in the form of the high-frequency normal map $HFN_{UV}$. Ground truth photometric normal for training may be obtained, similarly to the diffuse and specular maps used for training the deep learning neural network model for diffuse-specular estimation, from light-stage or equivalent function measurements and/or rendering derived therefrom.

The high-frequency normal map $HFN_{UV}$ is then superposed with geometric normal to obtain the photometric normal map $PN_{UV}$ in the same way as for the direct calculation approach.

In a still further approach, the second deep learning neural network model may instead be trained to infer the photometric normal map $PN_{UV}$ directly based on the tangent normal map $TN_{UV}$, the mesh 20 and optionally one or both (or a sum of) of the diffuse $DF_{UV}$ and specular $SP_{UV}$ maps.

EXPERIMENTAL EXAMPLES

Examples of training data (FIGS. 16A to 18C), object images $IM_n$ (FIGS. 19A to 19C) and outputs of the method (FIGS. 20A to 25B) shall be presented.

These examples relate to an implementation of the method in which object images $IM_n$ included mutually exclusive subsets MESH and REFLECT. The subset MESH were obtained as frame captures from video recorded using a handheld device 12 in the form of an iPhone 13 Pro® which was moved through a first longitudinal β arc and a second latitudinal α arc, both arcs covered ±45° from a midline 8 approximately corresponding to a frontal view of a subjects 1 face. The total number of object images $IM_n$ extracted from the video clips for the subset MESH was varied depending on the number of acceptable frames which could be extracted from the video clip data as object images $IM_n$. For example, there might be motion blur in the image depending on how fast the user moved the handheld device 12 during the capture. Blurry images will be discarded (and may be determined using conventional approaches as applied to autofocus application). Additionally or alternative, the subject 1 might blink and such images will also be discarded (having been determined via pre-processing analysis), leaving a number of object images $IM_n$ for structure-from-motion which is not determinable in advance. Typically, the total number of object images $IM_n$ extracted from the video clips for the subset MESH was in the range of 15 to 30.

The subset REFLECT included first, second and third object images $IM_1$, $IM_2$, $IM_3$ (and did not overlap the subset MESH), corresponding to view directions $n_1$, $n_2$, $n_3$ generally in the equatorial plane $\alpha_1=\alpha_2=\alpha_3=0°$ and corresponding to longitudinal angles $\beta_1=-45°$, $\beta_2=0°$ and $\beta_3=45°$.

The mesh 20 generation (step S2) used structure-from-motion applied to the subset MESH. The methods used are described in Ozyesil, Onur & Voroninski, Vladislav & Basri, Ronen & Singer, Amit. (2017), "A Survey on Structure from Motion. Acta Numerica. 26. 10.1017/S096249291700006X".

The deep learning neural network used for the presented images was a diffusion model as described in OZDEN-IZCI2022 modified for a four channel output instead of three channels. The outputs included three channels for diffuse albedo and one channel for specular). The diffusion network 33 included K=25 generations.

The method has also been applied using the Pix2PixHD model of Wang et al, though the outputs presented herein were obtained using the diffusion model.

Diffuse-specular estimation (step S3) and tangent normal calculations (step S4) were conducted in camera-space (see FIGS. 11 and 14).

Training Data

The diffusion model used was trained in a data of 118 faces captured using the apparatus and methods described in PCT/GB2022/051819 to obtain for each the corresponding diffuse, specular and normal maps $DF_{UV}$, $SP_{UV}$, $PN_{UV}$. In particular, the capture arrangement used 8 iPads® for providing illumination and 5 iPhones® for capturing images (shown in FIG. 1 of PCT/GB2022/051819), with illumination conditions applying binary multiplexed patterns (see FIGS. 9A to 10F of PCT/GB2022/051819) and post processing using linear system analysis (see page 147, line 18 to page 155, line 20 and FIGS. 37A to 38B of PCT/GB2022/051819).

For each training face model, three principle images were rendered under multiple lighting conditions.

As the synthetic data was generated for training the diffusion model, realistic rendering was important to train for accurate inference of diffuse and specular for real object images $IM_n$. This was done by embedding physical-based models in our data rendering system to ensure realistic rendering results. The model used was Cook-Torrance BRDF as described in Cook, R. L., & Torrance, K. E. (1982), "A Reflectance Model for Computer Graphics, ACM Trans. Graph., 1(1), 7-24, https://doi.org/10.1145/357290.357293 (hereinafter "COOK1982").

To generate realistic lighting scenarios for the training images, thirty captured environment maps were used, including three environment maps obtained from the Internet and seven environment maps captured by the inventors. The ten environment maps were augmented to thirty environment maps by using rotation about the x-axis to generate further environment maps. The range of environmental lighting maps used covered various real-world lighting scenarios including the most complicated and dynamic ones.

For example, referring also to FIGS. 16A to 16C, a photorealistic rendering from the training set is shown from view directions roughly corresponding to angles $\beta_1=-45°$, $\beta_2=0°$ and $\beta_3=45°$. To counter the first, second and third object images $IM_1$, $IM_2$, $IM_3$ being in practice not at exactly $\beta_1=-45°$, $\beta_2=0°$ and $\beta_3=45°$ degrees from the midline 8 (frontal view), a certain degree of random angular transformation was applied then generating the training data images.

Referring also FIGS. 17A to 17C, the diffuse components corresponding to FIGS. 16A to 16C respectively are shown.

Referring also FIGS. 18A to 18C, the specular components corresponding to FIGS. 16A to 16C respectively are shown, inverted for visualisation.

The diffuse components shown in FIGS. 17A to 17C were obtained directly by texturing the measured diffuse map $DF_{UV}$ onto the measured mesh 20, before re-projecting to the respective view direction n. The diffuse components shown in FIGS. 17A to 17C provided ground truth diffuse values $Diff_0$ for training the diffusion model to infer diffuse maps $DF_n$.

The specular components shown in FIGS. 18A to 18C were obtained directly by texturing the measured specular map $SP_{UV}$ onto the measured mesh 20, before re-projecting to the respective view direction n. The specular components shown in FIGS. 18A to 18C provided ground truth specular values $Spec_0$ for training the diffusion model to infer specular maps $SP_n$.

Referring also to FIGS. 19A to 19C, examples of first, second and third object images $IM_1$, $IM_2$, $IM_3$ are shown for a human subject 1 and target region 5 corresponding to the subjects' 1 face.

The target region 5 (subject face) was masked in the first, second and third object images $IM_1$, $IM_2$, $IM_3$ of FIGS. 19A to 19C before onward processing. The masking method used was "pyfacer", https://pypi.org/project/pyfacer/, version 0.0.1 released Feb. 28, 2022.

Referring also to FIGS. 20A to 20C, camera-space diffuse maps $DF_1$, $DF_2$, $DF_3$ calculated using the diffusion model and corresponding to FIGS. 19A to 19C are shown.

Referring also to FIGS. 21A to 21C, camera-space specular maps $SP_1$, $SP_2$, $SP_3$ calculated using the diffusion model and corresponding to FIGS. 19A to 19C are shown. The specular maps $SP_1$, $SP_2$, $SP_3$ have been inverted for visualisation.

Referring also to FIGS. 22A to 22C, camera-space tangent normal maps $TN_1$, $TN_2$, $TN_3$ corresponding to FIGS. 19A to 19C are shown. The contrast of the tangent normal maps $TN_1$, $TN_2$, $TN_3$ has been re-normalised for visualisation.

Referring also to FIGS. 23A to 23C, the mesh 20 reconstructed from structure-from-motion processing of the subset MESH of object images $IM_n$ is shown.

The mesh 20 is shown without texturing, and from viewpoints corresponding to the view directions $n_1$, $n_2$, $n_3$ of the first, second and third object images $IM_1$, $IM_2$, $IM_3$.

Referring also to FIG. 24A, the UV-space diffuse map $DF_{UV}$ obtained by mapping and blending the camera-space diffuse maps $DF_1$, $DF_2$, $DF_3$ of FIGS. 20A to 20C onto the mesh 20 of FIGS. 23A to 23C is shown.

Figure 24B:
FIG. 24B shows a UV-space (texture-space) specular map obtained by mapping and blending the specular maps shown in FIGS. 21A to 21C onto the mesh shown in FIGS. 23A to 23C.

Referring also to FIG. 24B, the UV-space specular map $SP_{UV}$ obtained by mapping and blending the camera-space specular maps $SP_1$, $SP_2$, $SP_3$ of FIGS. 21A to 21C onto the mesh 20 of FIGS. 23A to 23C is shown.

Figure 24C:
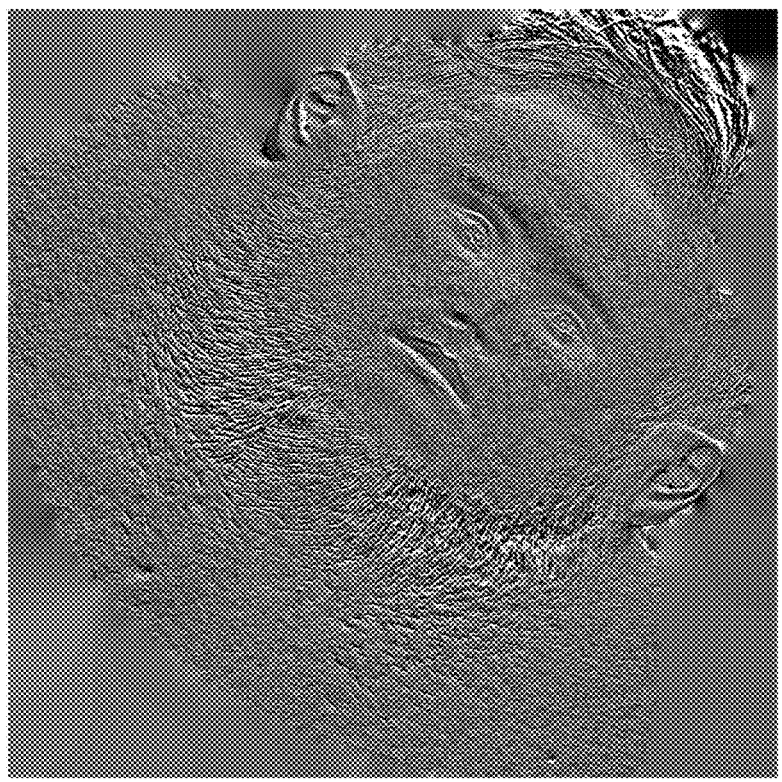
FIG. 24C shows a UV-space (texture-space) tangent normal map obtained by mapping and blending the tangent normal maps shown in FIGS. 22A to 22C onto the mesh shown in FIGS. 23A to 23C.

Referring also to FIG. 24C, the UV-space tangent normal map $TN_{UV}$ obtained by mapping and blending the camera-space tangent normal maps $TN_1$, $TN_2$, $TN_3$ of FIGS. 22A to 22C onto the mesh 20 of FIGS. 23A to 23C is shown.

Whilst shown with a UV parameterization which is continuous, in other UV parameterizations, the UV-space maps $DF_{UV}$, $SP_{UV}$, $TN_{UV}$ may be fragmented.

Figure 25A:
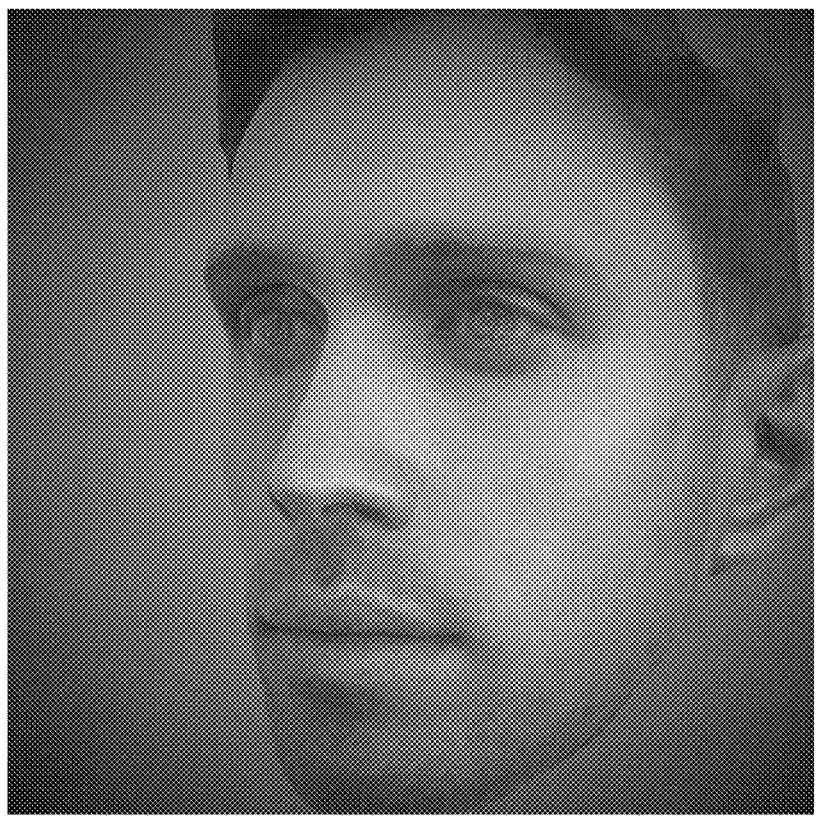
FIGS. 25A and 25B show photo-realistic renderings generated using the mesh shown in FIGS. 23A to 23C and the maps shown in FIGS. 24A to 24C.
Figure 25B:
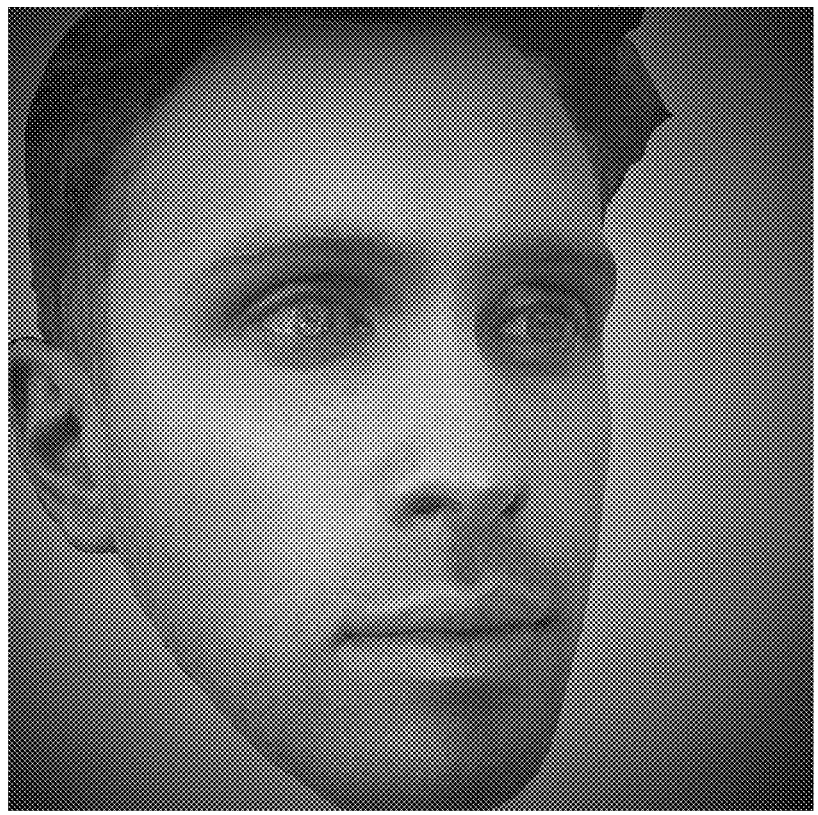

Referring also to FIGS. 25A and 25B, photo-realistic renderings are shown based on the mesh 20 shown in FIGS. 23A to 23C and the UV-space maps $DF_{UV}$, $SP_{UV}$, $TN_{UV}$ shown in FIGS. 24A to 24C, for a pair of view directions.

It may be observed from FIGS. 25A and 25B that the method is capable of capturing sufficiently accurate and detailed geometry (mesh) and appearance data (UV-space maps $DF_{UV}$, $SP_{UV}$, $TN_{UV}$) for a convincingly rendered model, using a relatively small set of input object images $IM_n$ obtained using a handheld device 12 in the form of a commercially available smartphone.

Handheld Device

Referring also to FIG. 26 a block diagram of an exemplary handheld device 12 in the form of a smart phone, tablet computer or the like is shown.

The handheld device 12 may be used to obtain the object images $IM_n$, as the initial step of the method (step S0). The handheld device 12 may then execute the subsequent steps of the method locally, or may transmit the object images $IM_n$ to a server 14 or other data processing device capable of carrying out the post-processing steps of the method (steps S1 though S7 at least).

The handheld device 12 includes one or more digital electronic processors 39, memory 40, and a colour display 41. The colour display 41 is typically a touchscreen, and may be used for either or both of guiding a user to capture the object images $IM_n$ and displaying a rendering of the finished model. The handheld device 12 includes also includes at least one camera 3 for use in obtaining the object images $IM_n$. A camera 3 of a handheld device 12 may be a front camera 3a oriented in substantially the same direction as the colour display 41, or a rear camera 3b orientated in substantially the opposite direction to the colour display 41. A handheld device 12 may include both front 3a and rear 3b cameras 3, or may include only one or the other type. A handheld device 12 may include two or more front cameras 3a and/or two or more rear cameras 3b For example, recent handheld devices 12 in the form of smart phones may include a front camera 3a and additionally two or more rear cameras 3b, typically having higher resolution than the front or "selfie" camera. A front imaging section 42 may include any front cameras 3a forming part of the handheld device 12, and also one or more front flash LEDs 43 used to provide a camera "flash" for taking picture in low-light conditions. If the flash is needed, then ambient lighting may be inadequate for the purposes of the methods described herein. A rear imaging section 44 may include any rear cameras 3b forming part of the handheld device 12, and also one or more rear flash LEDs 45. Although described as "sections", the cameras 3a, 3b and associated flash LEDs 43, 45 need not be integrated as a single device/package, and in many cases may simply be co-located on the respective faces of the handheld device 12.

The handheld device 12 may also include one or more depth sensors 4, each depth sensor 4 including one or more IR cameras 46 and one or more IR sources 47. When present, depth maps output by the depth sensor 4 may be provided corresponding to an object image $IM_n$ and incorporated as an input for mesh 20 generation as described hereinbefore.

The handheld device 12 also includes a rechargeable battery 48, one or more network interfaces 49 and non-volatile memory/storage 50. The network interface(s) 49 may be of any type, and may include universal serial bus (USB), wireless network (e.g IEEE 802.11b or 802.11), Bluetooth® and so forth. When the processing is not conducted locally, at least one network interface 49 is used to provide a wired or wireless link 51 to the network 15.

The non-volatile storage 50 stores an operating system 52 for the handheld device 12, and also program code 53 for implementing the specific functions required to obtain the object images $IM_n$, for example a user interface (graphical and/or audible) for guiding a user through the capture process. The non-volatile storage 50 may also store program code 53 for implementing the method, if it is to be executed locally. Optionally, the handheld device 12 may also store a local image cache 54. For example, the handheld device 12 may store a local copy of the object images $IM_n$ as well as transmitting the image across the link 51 to the server 14.

The handheld device 12 also includes a bus 55 interconnecting the other components, and additionally includes other components well known as parts of a handheld device 12.

When a front camera 3a is employed on a handheld device 12 including a screen such as colour display 41, the colour display 41 can also act as an area light-source illuminating the object 1 preferably with white light. This may be useful to supplement lower light ambient illumination. In some situations, for example if captured in a dark room or dimly lit environment, a screen such as the colour display 41 may be the only, or at least the dominant, light source illuminating the object 1. If instead a rear camera 3b is employed on a handheld device 12 such as a mobile/smart-phone or tablet, then the flash 45 adjacent to the rear camera 3b can be used to illuminate the object 1. This can be useful again in a dark or dimly-lit environment.

Environmental Illumination Capture

As described hereinbefore, the deep learning neural network model is trained using training images corresponding to a range of different environmental conditions, to allow inferring accurate diffuse and specular maps $DF_{UV}$, $SP_{UV}$ regardless of the specific environmental illumination corresponding to input object images $IM_n$.

However, accuracy may be improved if environmental illumination may be measured or estimated and taken into account in the diffuse-specular estimation (step S3).

In particular, the method may be extended to include receiving a number M of environment images $EN_1, \ldots, EN_M$, denoting the $m^{th}$ of M environment images as $EN_m$. Each environment image corresponds to a field of view oriented away from the object/subject 1. Preferably each environment image is directed opposite to the view direction r of a corresponding object image $IM_n$ (though there is no requirement that every object image $IM_n$ should have an environment image).

The deep leaning neural network is further configured (see description of FIG. 28 hereinafter) to receive additional input based on the environment images $EN_m$. For example, for each object image $IM_n$ in the subset REFLECT, the deep leaning neural network may also receive a corresponding environment images $EN_m$. Alternatively, when a video clip is obtained for extracting object images $IM_n$ for determining the mesh 20, a corresponding outward facing video clip may be obtained, and used to determine an environment map corresponding to all, or a portion of, a virtual sphere or cylinder focused on the object/subject 1.

Figure 27:
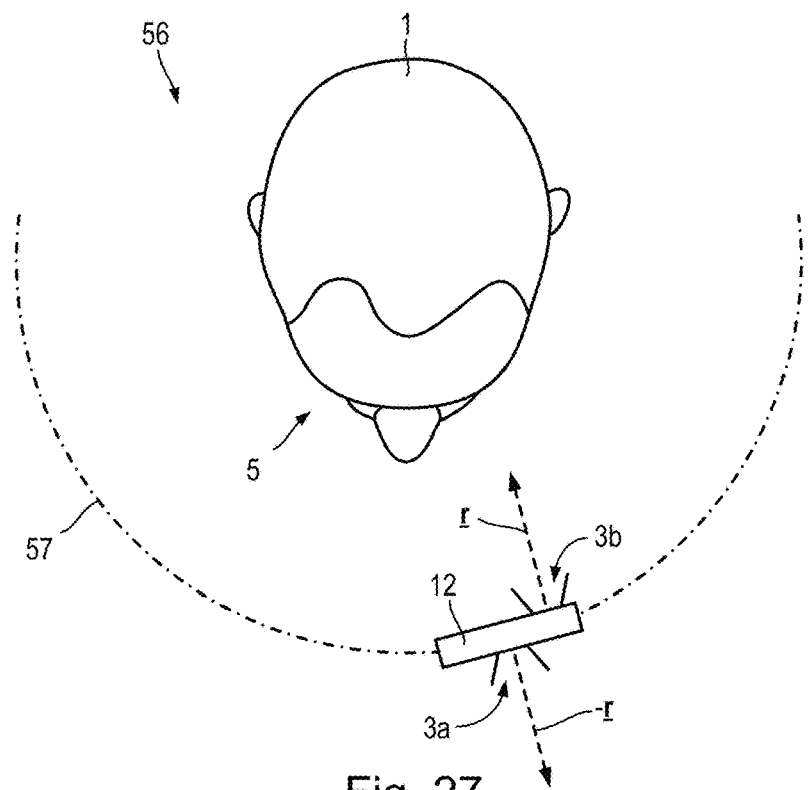
FIG. 27 schematically illustrates an image capture configuration for obtaining environment images for an extension of the method shown in FIG. 1.

Referring also to FIG. 27, an image capture configuration 56 is illustrated.

The image capture configuration 56 uses a handheld device 12 having front 3a and rear 3b facing cameras 3, for example a smartphone or a tablet. Either the front 3a or rear 3b camera(s) may be used to obtain object images $IM_n$ in any manner described hereinbefore. Preferably the camera 3 having the best resolution is used for object image $IM_n$ capturing, typically a rear camera 3b.

At the same time, the oppositely directed camera 3, for example the front camera 3a when the rear camera 3b obtains object images $IM_n$, obtains environment images $EN_m$. Preferably, though not essentially, each environment images $EN_m$ corresponds to, and is obtained concurrently with, a corresponding object image $IM_n$. In this way, the rear camera 3b captures an object image $IM_n$ whilst the front camera 3a captures an environment image $EN_m$ capturing details of the environment facing towards the part of the target region 5 being imaged. For example, the handheld device 12 may be moved in a longitudinal arc 57 roughly centred on the object/subject 1, whilst regularly or irregularly obtaining pairs of object images $IM_n$ and environment images $EN_m$. Alternatively, video clips may be obtained from both front 3a and rear 3b facing cameras as the handheld device 12 moves around the arc 57, with pairs of object images $IM_n$ and environment images $EN_m$ subsequently extracted as time-correlated frames.

When a front camera 3a is employed on a handheld device 12 including a screen such as colour display 41 being used to act as an area light-source illuminating the object 1, the environmental illumination can be calibrated as the illumination subtended from the colour display 41 size area source on to the object 1 from the direction and position of the camera 3 view which in turn can be determined using structure-from-motion reconstructions. If instead a rear camera 3b is employed and the rear flash 45 adjacent to the rear camera 3b is used to illuminate the object 1, the environment illumination can be calibrated in such a scenario based on camera 3 position and viewing direction with respect to the object 1.

In this way, by incorporating input based on the environment images $EN_m$, the deep learning neural network model may take account of environmental illumination conditions when inferring the estimated diffuse and specular maps $DF_{UV}$, $SP_{UV}$. For example, for each object image $IM_n$ in the subset REFLECT, the deep leaning neural network may also receive a corresponding environment image $EN_m$ obtained at the same time and having an oppositely directed field of view.

Figure 28:
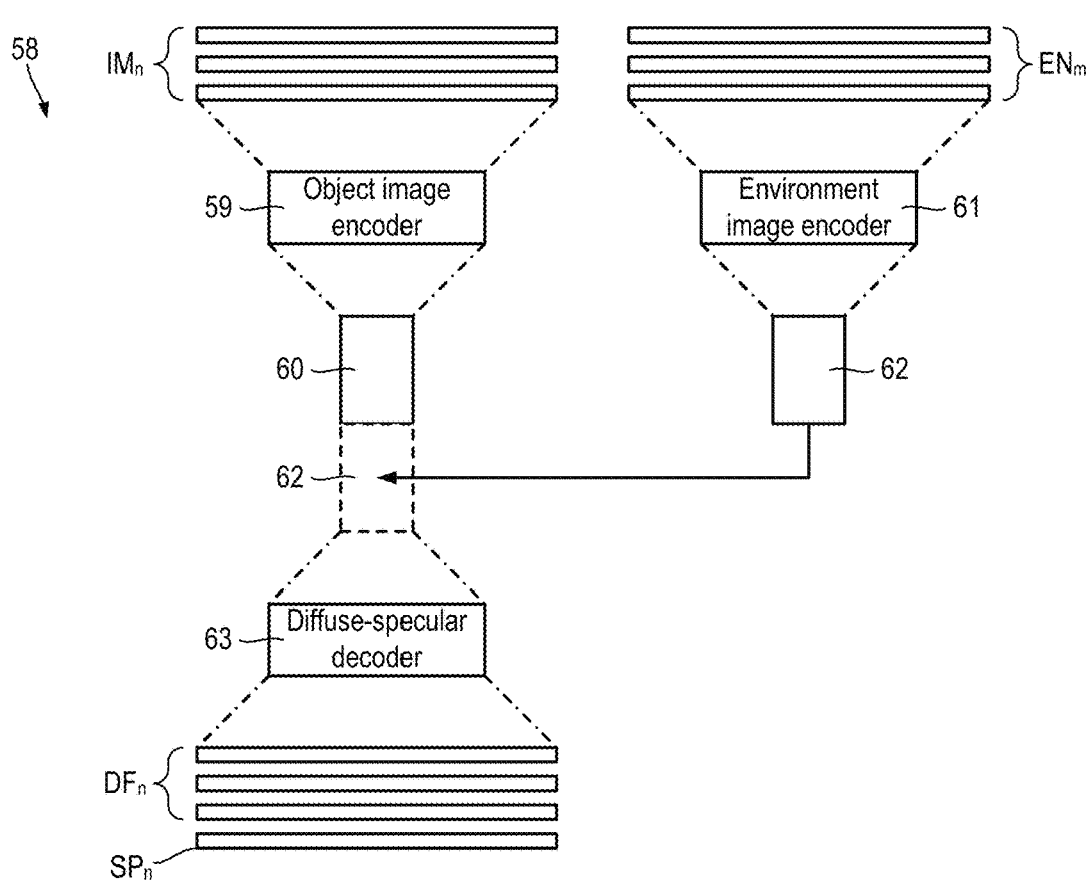
FIG. 28 schematically illustrates a deep learning neural network model adapted to incorporate environment image data.

Referring also to FIG. 28, an example of an adapted deep learning neural network model 58 is shown.

The adapted model 58 includes a first (object image) encoder 59 which converts an input image, for example an object image $IM_n$, into a first latent vector representation 60. The adapted model 58 also includes a second (environment image) encoder 61 which converts an environment image $EN_m$ corresponding to the input image $IM_n$ into a second latent vector representation 62. The first and second latent vector representations 60, 62 are concatenated and processed by a single, common decoder branch 63 to generate an output image having three channels corresponding to the diffuse map $DF_n$ and a fourth channel corresponding to the specular map $SP_n$. The encoders 59, 61 and decoder 63 may be any suitable networks used in image-to-image translation.

For example, in the case of a diffusion model, the environment image $EN_m$ may be provided as an additional input to one, some or all of the de-noising networks 35, 36.

Additionally or alternatively, the method may include mapping the environment images $EN_m$ to an environment map (not shown), and providing the environment map as an input to the deep learning neural network model (the only difference to the example shown in FIG. 28 would be the relative dimensionality of the second decoder 61).

The environment map may correspond to a sphere, or a portion of a sphere, approximately centred on the object 1 in a far-field configuration (not shown). Each pixel of each environment image $EN_m$ may be mapped to a corresponding region of the sphere surface. Mapping the environment images $EN_m$ to the environment map may also include infilling missing regions of the environment map, for example using known image-infilling deep learning neural network model. For example, the method may include infilling a region of the environment map corresponding to a convex hull of the environment images $EN_m$ when projected onto the sphere surface. Alternatively, the environment map may correspond to a far-field cylinder, or a portion of a far-field cylinder.

Resolution Enhancement of Diffuse Maps

The diffuse map $DF_n$, $DF_{UV}$ for the target region 5 estimated by the deep learning neural network tends to be slightly blurred compared to the corresponding original image $IM_n$, $IM_{UV}$.

This arises from a variety of factors including (without being limited to) that nature of deep learning neural networks and also because the original image $IM_n$, $IM_{UV}$ typically has higher resolution than the deep learning neural network predicted diffuse map $DF_n$, $DF_{UV}$. To add the very fine details to the output diffuse maps $DF_n$, $DF_{UV}$, the inventors have developed a final diffuse refinement step.

The diffuse refinement step will be explained in the context of camera-space diffuse-specular estimation and camera-space diffuse maps $DF_n$, but the process is equally applicable to UV-space diffuse maps $DF_{UV}$ directly output by the deep learning neural network based on a UV-space texture $IM_{UV}$.

First a low frequency image, denoted $LOW_n$ is generated by blurring the object image $IM_n$. This is slightly different to the blurred images generated during tangent normal map TN calculations, since it should not be converted to greyscale, but should retain the same number of colour channels as the object image $IM_n$.

A high-pass filtered image, noted $HIGH_n$ is obtained as $IM_n - LOW_n$. A normalised high-pass filtered image, denoted $NORM_n$ is generated by pixel-wise dividing the high-pass filtered image $HIGH_n$ by the input objection image $IM_n$. Finally, a refined diffuse map, denoted $REF_n$ is generated by pixel-wise multiplying the diffuse map $DF_n$ by a linear function of the normalised high-pass filtered image $NORM_n$. Empirically, the inventors have found the good results may be obtained using the function:

$$REF_n(i,j,k) = DF_n(i,j,k) * [1 + 0.5 * NORM_n(i,j,k)]$$

in which $1 \leq i \leq I$ and $1 \leq j \leq J$ denote pixel coordinates in the plane of the image having resolution I by J, and $1 \leq k \leq K$ denotes the colour channel. For example, an RGB image $IM_n$ may have k=1 denoting red, k=2 denoting green and k=K=3 denoting blue. If the diffuse map $DF_n$ has lower resolution then I by J, it should be up-sampled to the same resolution before calculating the refined diffuse map $REF_n$.

The use of the normalised high-pass filtered image $NORM_n$ allows re-introducing high-frequency details, whilst minimising or avoiding re-introduction of specular components due to the preceding normalisation by the original object image $IM_n$. The refined diffuse map $REF_n$ may then be substituted for the diffuse map DFn in any subsequent processing steps described herein.

As mentioned hereinbefore, the same processing may be applied to the UV-space texture $IM_{UV}$ and a corresponding diffuse map $DF_{UV}$ generated by the deep learning neural network model, to obtain a refined UV-space diffuse map $REF_{UV}$.

Whilst one example of the linear function of the normalised high-pass filtered image $NORM_n$ has been shown, in the relative weighting of the normalised high-pass filtered image $NORM_n$ need not be 0.5, and may be varied/tuned depending on the specific application.

MODIFICATIONS

It will be appreciated that various modifications may be made to the embodiments hereinbefore described. Such modifications may involve equivalent and other features and/or methods which are already known in the design, manufacture and use of lighting, image/video processing techniques and/or apparatuses for lighting and/or executing image/video processing techniques, and/or component parts thereof, and which may be used instead of or in addition to features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method comprising:
receiving a plurality of object images of an object, each object image obtained under ambient lighting conditions using a handheld device and corresponding to a different view direction, wherein the plurality of object images comprises first and second object images corresponding to first and second directions;
determining a global coordinate space based on plurality of object images, and mapping out the relative positions and viewpoints corresponding to each object image;
determining a mesh corresponding to the target region of the object surface based on a first subset of the plurality of object images which comprises two or more object images of the plurality of object images;
determining diffuse and specular maps corresponding to the target region of the object surface based on processing a second subset of the object images using a deep learning neural network model trained to estimate diffuse and specular albedo components based on an input image, wherein the second subset comprises at least the first and second object images;
determining a tangent normal map corresponding to the target region of the object surface based on high-pass filtering each object image of the second subset;
storing and/or outputting the mesh, the diffuse map, the specular map and the tangent normal map;
wherein determining diffuse and specular maps corresponding to the target region of the object surface comprises:
for each of the second subset of the object images:
providing that object image as input to the deep learning neural network model and obtaining a corresponding camera-space diffuse map and a corresponding camera-space specular map as output.

2. The method of claim 1, wherein the plurality of object images comprises video data, and wherein the method comprises extracting the first subset of object images upon which the mesh determination is based from the video data.

3. The method of claim 1, wherein determining diffuse and specular maps corresponding to the target region of the object surface comprises:
for each of the second subset of the object images:
generating a UV-space diffuse map based on projecting the camera-space diffuse maps corresponding to the second subset of the object images onto the mesh;
generating a UV-space specular map based on projecting the camera-space specular maps corresponding to the second subset of the object images onto the mesh.

4. The method of claim 1, wherein determining the mesh corresponding to the target region of the object surface comprises applying a structure-from-motion technique to the first subset of the object images.

5. The method of claim 1, wherein the plurality of object images comprises one or more depth maps of the target region and/or one or more structured light images of the target region;
wherein the first subset of the object images upon which determination of the mesh is based comprises one or more depth maps and/or one or more structured light images.

6. The method of claim 1, wherein determining a mesh corresponding to the target region of the object surface comprises fitting a 3D morphable mesh model, 3DMM, to the first subset of the object images.

7. The method of claim 1, wherein determining a mesh corresponding to the target region of the object surface comprises a neural surface reconstruction technique.

8. The method of claim 1, wherein the deep learning neural network model comprises a multi-layer perceptron.

9. The method of claim 1, wherein the deep learning neural network model comprises a convolutional neural network.

10. The method of claim 1, further comprising receiving a plurality of environment images, each environment image corresponding to a field of view oriented away from the object;
wherein the deep leaning neural network is further configured to receive additional input based on the plurality of environment images.

11. The method of claim 10, further comprising mapping the plurality of environment images to an environment map, and providing the environment map as an input to the deep learning neural network model.

12. The method of claim 1, wherein determining the tangent normal map comprises:
generating camera-space tangent normal maps based on high-pass filtering of the second subset of object images;
generating a UV-space tangent normal map based on projecting the camera-space tangent normal maps corresponding to the second subset onto the mesh.

13. The method of claim 1, further comprising determining a photometric normal map corresponding to the target region of the object surface based on the mesh and the tangent normal map.

14. The method of claim 13, wherein the photometric normal map is determined by:
- determining high spatial-frequency components of surface normals as the output of providing the tangent normal map as input to a second deep learning neural network model trained to infer high spatial-frequency components of surface normals;
- determining the photometric normal map by combining the high spatial-frequency components of surface normals with mesh normals.

15. The method of claim 1, further comprising using a handheld device comprising a camera to obtain the plurality of object images under ambient lighting conditions.

16. The method of claim 1, further comprising processing one or more diffuse maps output by the deep learning neural network model and corresponding to an input image, comprising:
- generating a low-frequency image by blurring the input image;
- generating a high-pass filtered image by subtracting the low-frequency image from the input image;
- normalising the high-pass filtered image by pixelwise dividing by the input image; and
- generating a refined diffuse map based on pixelwise multiplying the diffuse map by a linear function of the normalised high-pass filtered image.

17. A method of imaging an object comprising:
- obtaining a plurality of object images of an object using a first camera of a handheld device, each object image corresponding to a different view direction of the first camera,
- obtaining a plurality of environment images using a second camera of the handheld device, wherein the second camera is arranged with a field of view oriented substantially opposite to the first camera, wherein each environment image corresponds to an object image of the plurality of object images;

wherein the plurality of object images comprises first and second object images corresponding to first and second directions.

18. Apparatus configured:
- to receive a plurality of object images of an object, each object image obtained under ambient lighting conditions using a handheld device and corresponding to a different view direction, wherein the plurality of object images comprises first and second object images corresponding to first and second directions;
- to determine a global coordinate space based on plurality of object images, and to map out the relative positions and viewpoints corresponding to each object image;
- to determine a mesh corresponding to the target region of the object surface based on a first subset of the plurality of object images which comprises two or more object images of the plurality of object images;
- to determine diffuse and specular maps corresponding to the target region of the object surface based on processing a second subset of the object images using a deep learning neural network model trained to estimate diffuse and specular albedo components based on an input image, wherein the second subset comprises at least the first and second object images;
- to determine a tangent normal map corresponding to the target region of the object surface based on high-pass filtering each object image of the second subset;
- to store and/or to output the mesh, the diffuse map, the specular map and the tangent normal map;

wherein the configuration to determine diffuse and specular maps corresponding to the target region of the object surface comprises:
- for each of the second subset of the object images, the apparatus is configured to:
- provide that object image as input to the deep learning neural network model and obtain a corresponding camera-space diffuse map and a corresponding camera-space specular map as output.

* * * * *